US009895917B2

United States Patent
Corvese et al.

(10) Patent No.: US 9,895,917 B2
(45) Date of Patent: Feb. 20, 2018

(54) PRINTER MOBILITY AND SCALABILITY

(71) Applicant: ZIH Corp., Lincolnshire, IL (US)

(72) Inventors: Matthew D. Corvese, Warwick, RI (US); Roy P. Lyman, Coventry, RI (US); Gregory J. Klein, Wakfield, RI (US); Patrick J. Hegarty, Dedham, MA (US); Michael L. Lamontagne, Johnston, RI (US); Raymond J. LeBlanc, Charleston, RI (US); David F. Beck, Exeter, RI (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 15/273,363

(22) Filed: Sep. 22, 2016

(65) Prior Publication Data

US 2017/0008320 A1 Jan. 12, 2017

Related U.S. Application Data

(63) Continuation of application No. 14/936,046, filed on Nov. 9, 2015, now Pat. No. 9,475,319, which is a (Continued)

(51) Int. Cl.
*B41J 29/02* (2006.01)
*G06F 3/12* (2006.01)
(Continued)

(52) U.S. Cl.
CPC ............ *B41J 29/02* (2013.01); *G06F 3/1225* (2013.01); *G06F 3/1236* (2013.01);
(Continued)

(58) Field of Classification Search
CPC .. B41J 29/02; B41J 29/393; B41J 3/36; H02J 7/0042; H02J 7/0021; G06F 3/1225;
(Continued)

(56) References Cited

U.S. PATENT DOCUMENTS 1,807,911 A 6/1931 Garbell
5,186,558 A 2/1993 Sherman et al.
(Continued)

FOREIGN PATENT DOCUMENTS

DE 3609789 10/1987
EP 0908318 4/1999
(Continued)

OTHER PUBLICATIONS

P. Moens et al., Guest Editors; Guest Editorial Introduction to the Special Issue on Smart Power Device Reliability, IEEE Transactions on Device and Materials Reliability, vol. 6 No. 3 (2006) pp. 347-348; available in U.S. Appl. No. 13/085,438, to which priority is claimed.

(Continued)

*Primary Examiner* — Alessandro Amari
*Assistant Examiner* — Roger W Pisha, II

(57) ABSTRACT

Provided herein are devices, methods and other means, including those related to printers, as well as computer readable media for storing code to execute instructions for a device, and other systems for providing and supporting mobile printing and other types of devices. An example disclosed printer includes circuitry that includes: a processor; connector circuitry; and input/output circuitry; a first circuit board onto which the processor is disposed; a second circuit board onto which the connector circuitry is disposed; and a third circuit board onto which the input/output circuitry is disposed.

19 Claims, 21 Drawing Sheets

Related U.S. Application Data continuation of application No. 13/085,438, filed on Apr. 12, 2011, now Pat. No. 9,287,724.

(60) Provisional application No. 61/345,987, filed on May 18, 2010, provisional application No. 61/323,264, filed on Apr. 12, 2010.

(51) Int. Cl.
    *H02J 7/00*     (2006.01)
    *H04W 76/04*     (2009.01)

(52) U.S. Cl.
    CPC .......... *G06F 3/1292* (2013.01); *H02J 7/0021* (2013.01); *H02J 7/0042* (2013.01); *H04W 76/04* (2013.01); *Y10T 29/49002* (2015.01)

(58) Field of Classification Search
    CPC ................ G06F 3/1236; G06F 3/1292; Y10T 29/49002; H04W 76/04
See application file for complete search history.

(56) References Cited

U.S. PATENT DOCUMENTS

| | | | |
|---|---|---|---|
| 5,188,029 | A | 2/1993 | Sugimoto et al. |
| 5,209,374 | A | 5/1993 | Seidl-Lichthardt |
| 5,267,800 | A | 12/1993 | Petteruti et al. |
| 5,427,460 | A | 6/1995 | Kajiya et al. |
| 5,520,470 | A | 5/1996 | Willett |
| 5,713,679 | A | 2/1998 | Taylor |
| 5,820,068 | A | 10/1998 | Hosomi et al. |
| 6,092,945 | A | 7/2000 | Takami et al. |
| 6,095,704 | A | 8/2000 | Jaeger et al. |
| 6,351,621 | B1 | 2/2002 | Richards et al. |
| 6,491,459 | B2 | 12/2002 | Hosomi |
| 6,505,981 | B1 | 1/2003 | Takami et al. |
| 6,530,705 | B1 | 3/2003 | Petteruti et al. |
| 6,540,122 | B1 | 4/2003 | Petersen |
| 6,607,316 | B1 | 8/2003 | Petteruti et al. |
| 6,742,887 | B2 | 6/2004 | Ando |
| 6,776,542 | B1 | 8/2004 | Kearney |
| 6,789,969 | B2 | 9/2004 | Hirabayashi et al. |
| 6,916,128 | B1 | 7/2005 | Petteruti et al. |
| 6,962,292 | B1 | 11/2005 | Benton et al. |
| 6,991,130 | B2 | 1/2006 | Presutti et al. |
| 7,033,097 | B2 | 4/2006 | Petteruti et al. |
| 7,066,754 | B2 | 6/2006 | Beck et al. |
| 7,153,051 | B2 | 12/2006 | Takahashi |
| 7,286,260 | B2 | 10/2007 | Silverbrook |
| 7,287,850 | B2 | 10/2007 | Matsui et al. |
| 7,306,386 | B2 | 12/2007 | Lyman et al. |
| 7,347,543 | B2 | 3/2008 | Kan et al. |
| 7,500,732 | B2 | 3/2009 | James et al. |
| 7,578,332 | B2 | 8/2009 | Murata et al. |
| 7,695,206 | B2 | 4/2010 | Kawakami et al. |
| 7,871,009 | B1 | 1/2011 | Blonigen et al. |
| 2004/0096256 | A1 | 5/2004 | Hayashi et al. |
| 2005/0002715 | A1* | 1/2005 | Fries ............. B41J 3/4075 400/88 |
| 2006/0046543 | A1 | 3/2006 | Fujii |
| 2006/0092193 | A1 | 5/2006 | Block et al. |
| 2006/0216098 | A1* | 9/2006 | Lyman ............. B41J 3/4075 400/613 |
| 2006/0250480 | A1 | 11/2006 | King et al. |
| 2007/0002402 | A1 | 1/2007 | Ochiai et al. |
| 2007/0052991 | A1 | 3/2007 | Goodman et al. |
| 2007/0066343 | A1 | 3/2007 | Silverbrook et al. |
| 2008/0075513 | A1 | 3/2008 | Robertson et al. |
| 2008/0291038 | A1 | 11/2008 | Kobayashi et al. |
| 2008/0298870 | A1 | 12/2008 | Tsirline et al. |
| 2009/0284576 | A1 | 11/2009 | Sekino et al. |
| 2011/0242182 | A1 | 10/2011 | Asada et al. |

FOREIGN PATENT DOCUMENTS

| | | |
|---|---|---|
| EP | 1647406 | 4/2006 |
| EP | 1650041 | 4/2006 |
| EP | 1679198 | 7/2006 |
| EP | 1679199 | 7/2006 |
| EP | 2322435 | 5/2011 |
| EP | 2682271 | 1/2014 |
| JP | 2001106216 | 4/2001 |
| JP | 2006264313 | 10/2006 |
| WO | 2001038098 | 5/2001 |
| WO | 20050042351 | 5/2005 |
| WO | 20080034018 | 3/2008 |

OTHER PUBLICATIONS

"Save Energy in Ethernet Devices: Network Connectivity Proxying Enables Existing Power" [online] [retrieved from the Internet: <URL:http:Wwww.thefreelibrary.com/_/print/PrintArticle. aspx?id=177056393>, 2 pages; available in U.S. Appl. No. 13/085,438, to which priority is claimed.

Norford, L.K. et al. "Near Term Technology Review of Electronic Office Equipment" IEEE (1993 pp. 1355-1362; available in U.S. Appl. No. 13/085,438, to which priority is claimed.

Webber, C.A. et al. "After Hours Power Status of Office Equipment in the USA" Energy Analysis Department, Environmental Energy Technologies Division, Lawrence Berkeley National Laboratory, Berkeley, CA (2005) 41 pages; available in U.S. Appl. No. 13/085,438, to which priority is claimed.

Partial PCT Search Report for International Application No. PCT/US2012/071720 dated Sep. 4, 2013; available in U.S. Appl. No. 13/085,438, to which priority is claimed.

PCT Search Report for International Application No. PCT/US2011/032167 dated Aug. 29, 2012.; available in U.S. Appl. No. 13/085,438, to which priority is claimed.

Partial PCT Search Report for International Application No. PCT/US2011/032167 dated May 2, 2012.; available in U.S. Appl. No. 13/085,438, to which priority is claimed.

PCT Search Report for International Application No. PCT/US2011/032190 dated Mar. 20, 2012.; available in U.S. Appl. No. 13/085,438, to which priority is claimed.

Partial Search Report for International Application No. PCT/US2011/032190 dated Jun. 28, 2011.; available in U.S. Appl. No. 13/085,438, to which priority is claimed.

Search Report and Written Opinion for International Application No. PCT/US2011/032179 dated Jun. 14, 2011.; available in U.S. Appl. No. 13/085,438, to which priority is claimed.

Communication from the Examining Division of the European Patent Office dated Nov. 19, 2014 in connection with EP Patent Application No. 11717085.2.; available in U.S. Appl. No. 14/936,046, to which priority is claimed.

\* cited by examiner

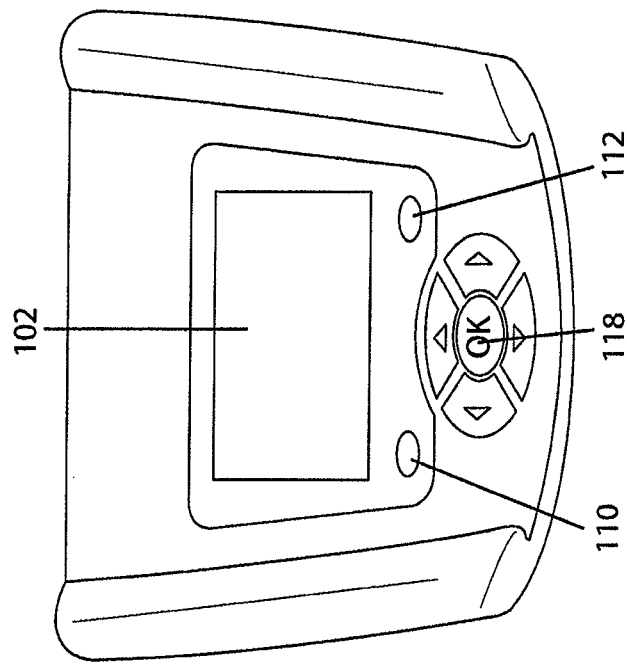
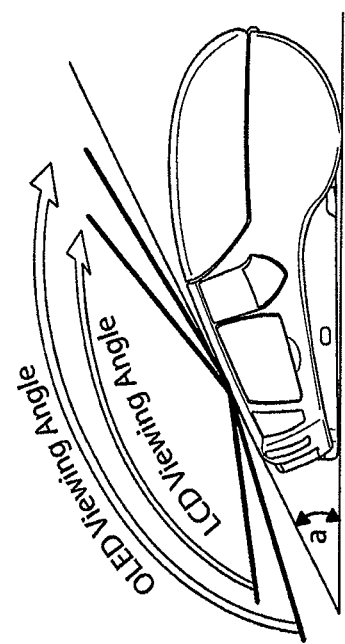
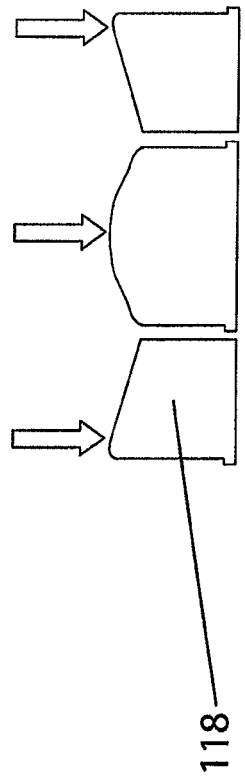
FIG. 2B
FIG. 2C
FIG. 2A

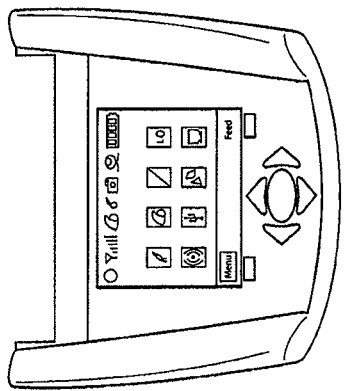
FIG. 3A
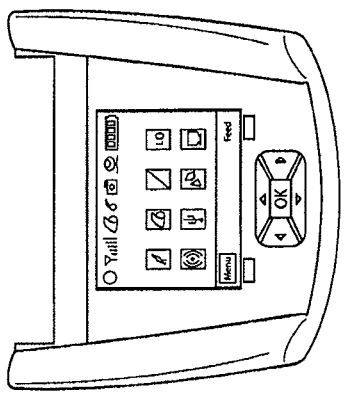
FIG. 3B
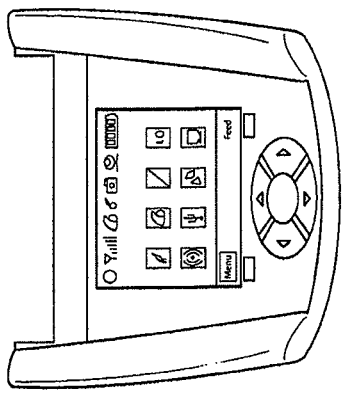
FIG. 3C
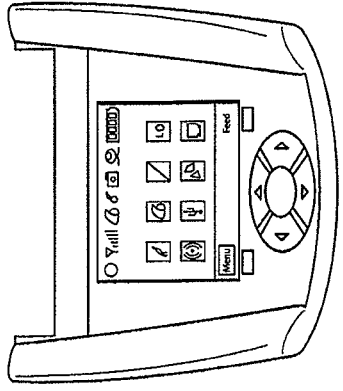
FIG. 3D
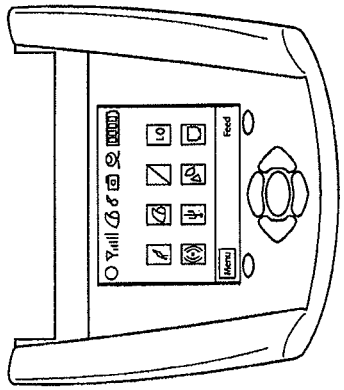
FIG. 3E
FIG. 3F

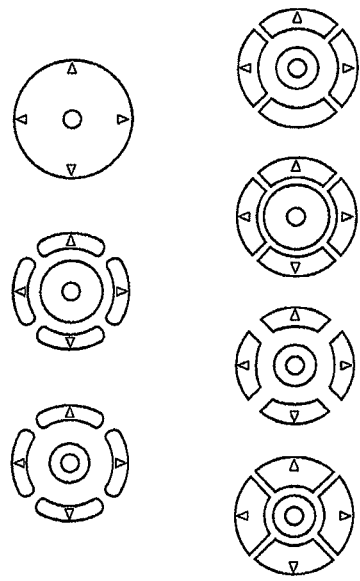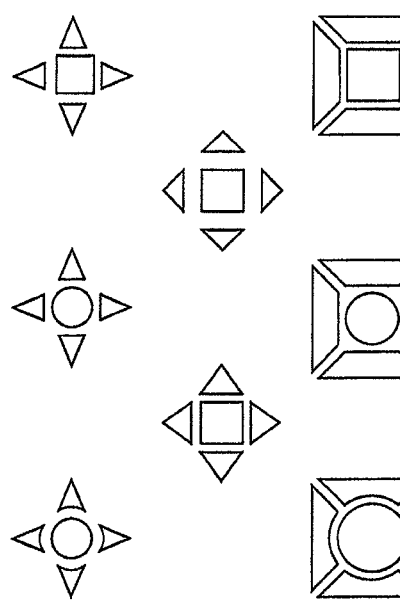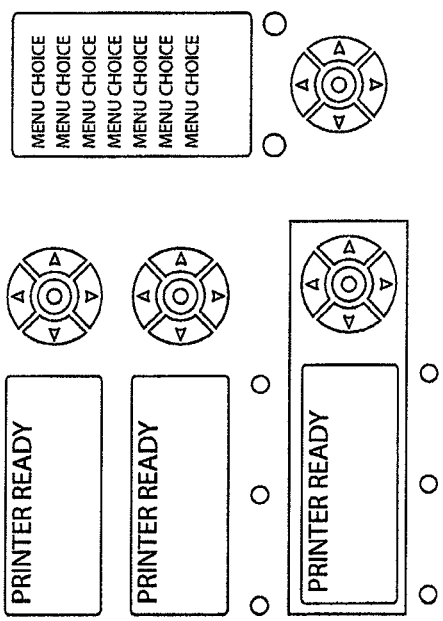

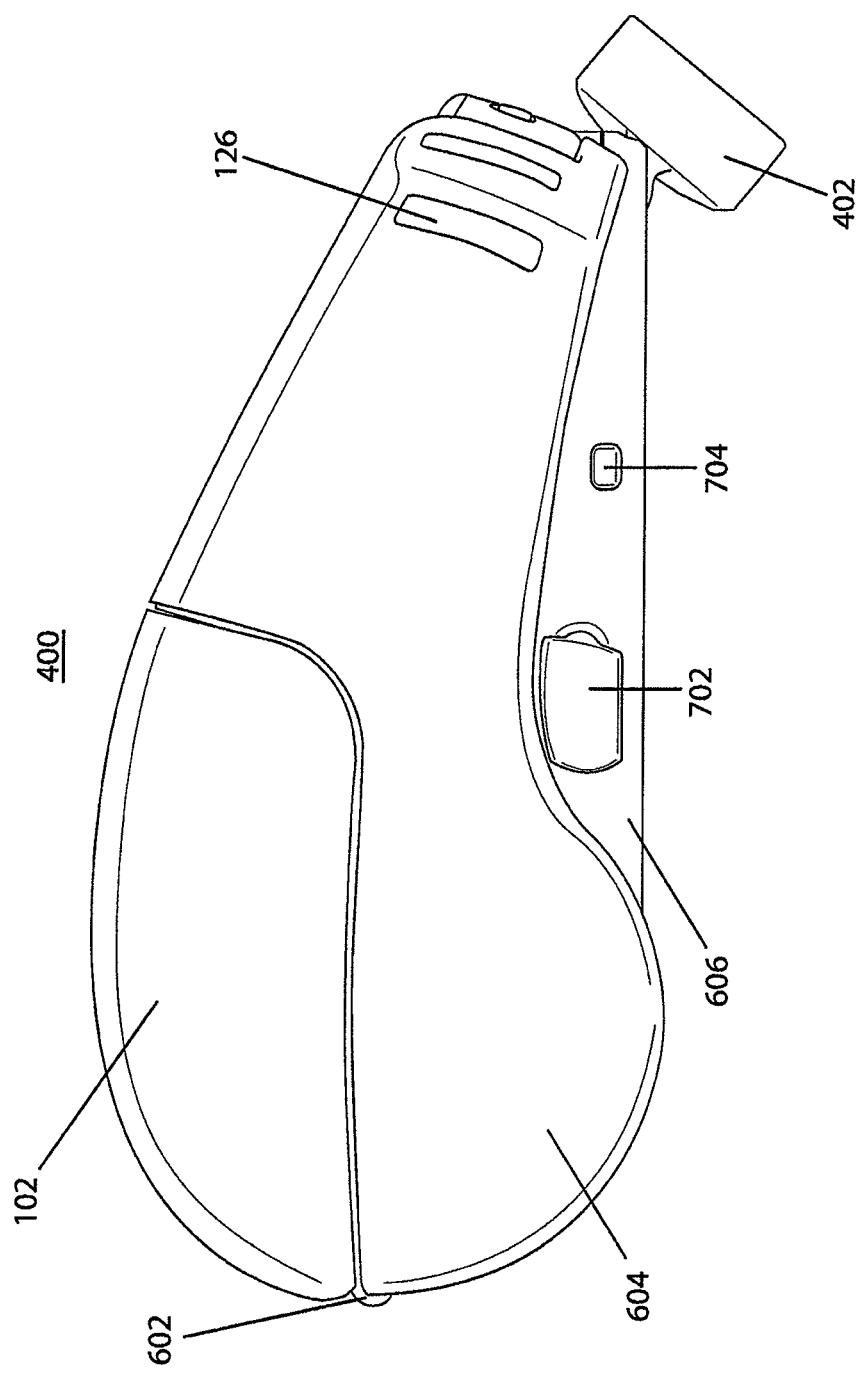

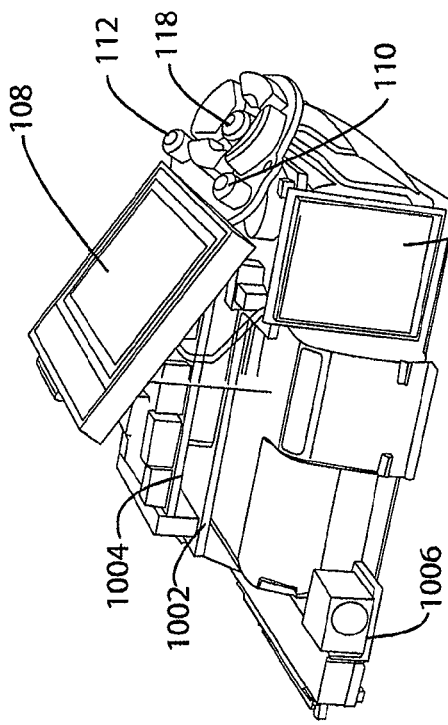
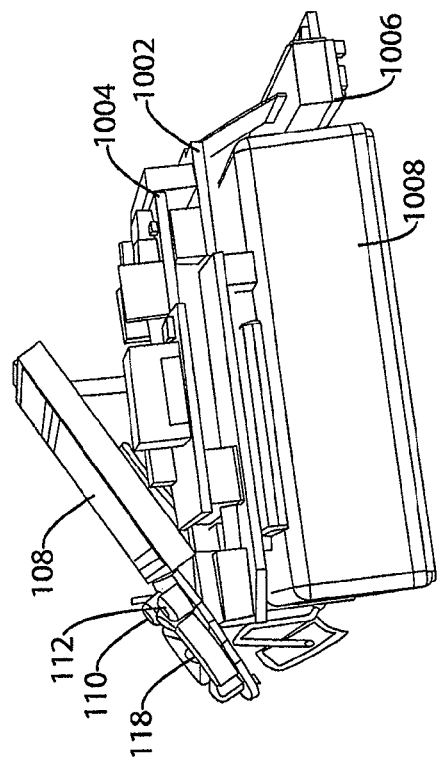
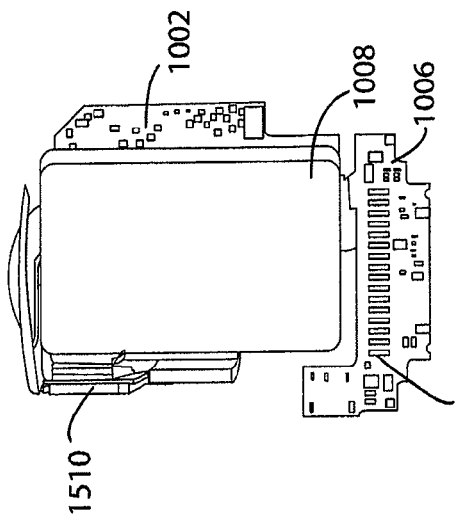
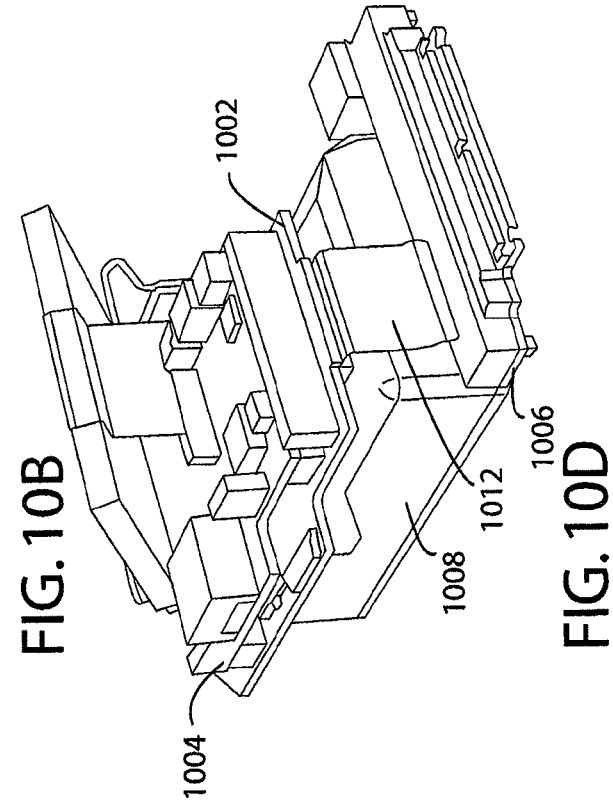
FIG. 10C
FIG. 10E
FIG. 10B
FIG. 10D

PRINTER MOBILITY AND SCALABILITY

CROSS-REFERENCE TO RELATED APPLICATIONS

This patent arises from a continuation of U.S. patent application Ser. No. 14/936,046, filed Nov. 9, 2015, now U.S. Pat. No. 9,475,319, which is a continuation of U.S. patent application Ser. No. 13/085,438, filed Apr. 12, 2011, now U.S. Pat. No. 9,287,724, which claims the benefit of U.S. Provisional Application No. 61/345,987, filed May 18, 2010, and U.S. Provisional Application No. 61/323,264, filed Apr. 12, 2010. U.S. patent application Ser. No. 14/936, 046, U.S. patent application Ser. No. 13/085,438, U.S. Provisional Application No. 61/345,987 and U.S. Provisional Application No. 61/323,264 are hereby incorporated herein by reference in their entireties.

FIELD

Embodiments discussed herein are related to printers and, more particularly, to systems, methods, apparatuses, computer readable media products and other means for providing mobile printer networking and related functionality.

BACKGROUND

Printers are designed and known to be used in traditional office environments. Some printers have a more portable design that allows them to be used for many other applications beyond traditional office printing, such as printing customer receipts at the point of delivery, price tags at product display shelves, shipment labels, parking garage receipts, adhesive labels, law enforcement tickets, and gas and utility inspection documents at people's homes. Through applied effort, ingenuity, and innovation, various printer improvements are embodied by the present invention, examples of which are discussed below.

SUMMARY

Some embodiments discussed herein are related to printers and other devices that lack at least one traditional seam in its external housings. For example, some printers currently include a lateral seam that is formed when a printer's top housing portion is mated to a printer's bottom housing portion. To increase durability and scalability for devices (e.g., to enable a common printer base and circuitry to accommodate various label sizes), the shape of the housing portions can be changed such that the seam runs along the bottom causing the top portion to surround and/or otherwise protect at least most (or even all) of five of the six sides of the device. In this regard, the shape and the size of the printer can be defined almost entirely by one piece of the housing, sometimes referred to herein as the "defining portion" of the housing, while the networking interface(s), accessory interface(s), chassis, circuitry and/or other common printer components can be mounted or otherwise protected by a second piece of the housing (sometimes referred to herein as the "base portion" of the housing), wherein the base portion of the housing can be substantially similar or the same for printers that otherwise look completely different.

As another example, while some printers and other apparatuses currently include an overmold, the overmold often bridges a seam between the top and bottom portions of the housing. In accordance with some embodiments discussed herein, the overmold can be applied to only the defining portion and/or otherwise located in a location remote from the seam between the base and defining portions of the housing. Additionally, the custom designed overmold can enable universal serial bus ("USB") and/or other type(s) of cables to be mounted with a custom molded (e.g., plastic) strain relief component (which may be part of the cable assembly) that is configured to lock the cable into place when engaged with the printer. The strain relief component can be configured to transfer at least most (if not all) external stress applied to the cable(s) into the housing to relieve stress from, e.g., the USB connector mounted on, e.g., the device's printed circuit board.

For example, some embodiments may include a printer, comprising: circuitry; a housing that at least substantially defines a shape of the printer's six sides, the housing including a base portion, a defining portion and an overmold, wherein: the defining portion at least substantially defines the printer's first side; the defining portion at least substantially defines the printer's second side; the defining portion at least substantially defines the printer's third side; the defining portion at least substantially defines the printer's fourth side; the defining portion at least substantially defines the printer's fifth side; the base portion at least substantially defines the printer's sixth side; the overmold at least partially covers the defining portion; and the overmold fails to cover the base portion.

The printer can further comprise a second overmold that at least partially covers the base portion.

The printer's sixth side can be the bottom of the printer. The printer's fifth side can be the top of the printer, which is located opposite the sixth side. The fifth side includes a media cover that is configured to open to allow the printer to receive a media roll. The shape and size of the printer can be at least partially related to the media roll's size.

In some embodiments, the overmold is seamless and/or covers a seamless portion of the housing. The overmold can be comprised at least mostly of rubber, plastic and/or any other suitable material, such as those that have a softer durometer than other parts of the housing onto which the overmold is placed. The defining portion can be comprised at least mostly of plastic, rubber, metal and/or any other suitable material. The overmold can be configured to allow the use of a custom molded plastic and/or other type of strain relief component that removably locks a cable to the printer and transfers any external stress to the printer's internal components as opposed to the housing. The overmold can also or instead be configured to allow the use of a USB connector strain relief component.

The printer's or other type of device's circuit boards and the components disposed thereon can be linked together such that the components of the various circuit board fit together like a three dimensional (3D) puzzle. For example, gaps left by components disposed on one circuit board can be at least partially filled by components disposed on a second circuit board. Such an approach, depending on how the components on each circuit board are layered together, can reduce emissions from the circuit boards (and their components) without using fasteners, shields and/or any other dedicated component. Instead, in some embodiments, one or more of the circuit boards can slide into slots in a frame (e.g., metal chassis and/or housing) and be held in place by the frame.

For example, a printer in accordance with some embodiments discussed herein can comprise: circuitry that includes: a processor; connector circuitry; and input/output circuitry; a first circuit board onto which the processor is disposed; a second circuit board onto which the connector circuitry is disposed; and a third circuit board onto which the input/output circuitry is disposed.

The circuitry can be disposed on the first circuit board and the third circuit board such that, when mounted in the printer the processor is disposed on a first side of the first circuit board, the first side facing the third circuit board; and the input/output circuitry is disposed on a second side of the third circuit board, the second side facing the first circuit board. The processor and the input/output circuitry can be positioned such that the input output circuitry is positioned in a first space unoccupied by the circuitry on the first circuit board; and the processor is positioned in a second space unoccupied by the circuitry on the third circuit board.

The printer can further comprise one or more frame components integrated or included inside the housing that have slots, wherein the first circuit board and the third circuit board can be installed into the printer by sliding into the slots included in the frame(s). For example, the first circuit board and the third circuit board can be installed into the printer by sliding into slots included in the printer's housing.

The printer can further comprise a ribbon cable that couples the first circuit board with the second circuit board.

The first circuit board, second circuit board and/or third circuit board can be positioned relative to each other (and the components disposed thereon) to reduce emissions among the printer's circuitry.

The printer can further comprise memory disposed on the first circuit board.

The connector circuitry can be wired-connector circuitry and/or wireless communications circuitry.

The printer can also or instead comprise wireless communications circuitry disposed on a fourth circuit board. The wireless communications circuitry may include a BLUETOOTH communications component disposed on a first side of the fourth circuit board and a WI-FI communications component disposed on a second side of the fourth circuit board. The first side and the second side of the fourth circuit board can face opposite directions.

The printer can further comprise another circuit board including power interface circuitry disposed thereon. The power interface circuitry can be configured to provide a flexible battery interface.

The printer's input/output circuitry can be configured to generate signals representing a user input from four directional buttons, a selection button and two soft buttons. The buttons may be arranged in any suitable manner relative to, e.g., a display screen and/or each other. The input/output circuitry can be further configured to generate signals that drive a display screen.

Some embodiments discussed herein may also include a removable belt clip that snaps or is otherwise secured by, e.g., the battery cover of a printer and/or other device. For example, a printer can comprise: a housing including a base portion and a defining portion, wherein the base portion includes: a battery receptacle; a removable battery cover; and a belt clip receptacle configured to receive a removable belt clip.

The belt clip receptacle can include a rounded cavity. The removable battery cover can be mated with the battery receptacle, and be configured to: aid in preventing batteries from falling out of the battery receptacle; and aid in preventing a belt clip from falling out of the belt clip receptacle.

The removable battery cover can be configured to substantially fill the belt clip receptacle when a belt clip is not filling the belt clip receptacle. This may help prevent dirt and other material from getting into the battery receptacle when the belt clip is not inserted into the belt clip receptacle.

The printer further comprising at least one lanyard channel included in the defining portion.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Having thus described the invention in general terms, reference will now be made to the accompanying drawings, which are not necessarily drawn to scale, and wherein:

FIGS. 2A, 2B and 2C show display screens and input buttons that may be incorporated into mobile printers in accordance with some embodiments discussed herein;

FIGS. 3A-3L show additional exemplary arrangements of input buttons and display screens that may be incorporated into mobile printers in accordance with some embodiments discussed herein;

FIG. 7 shows a left side view of the mobile printer discussed in connection with FIG. 4;

Figure 8A:
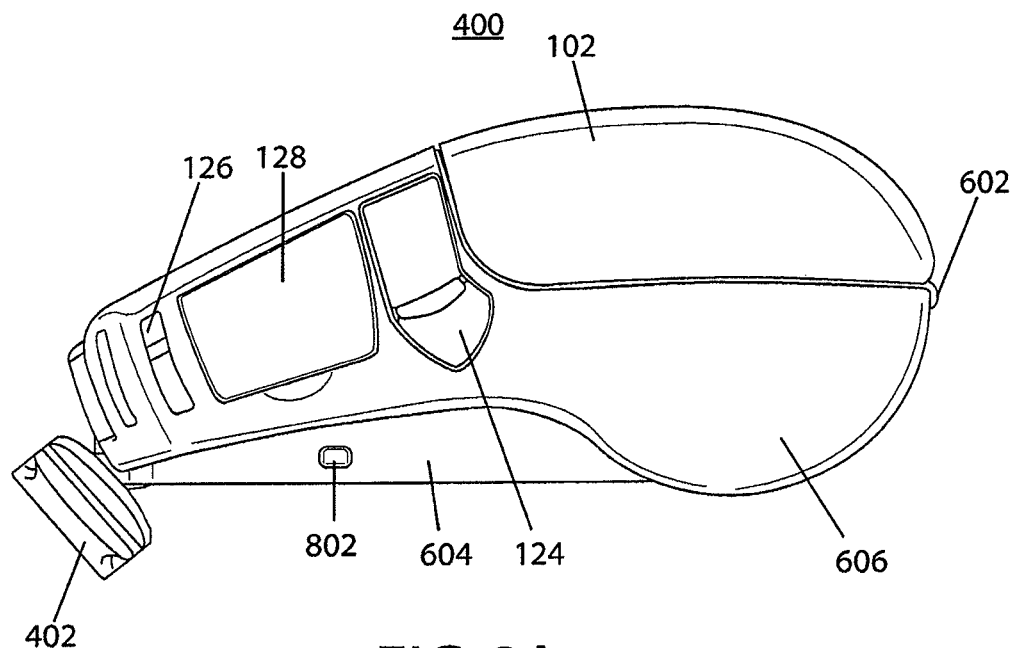
Figure 8B:
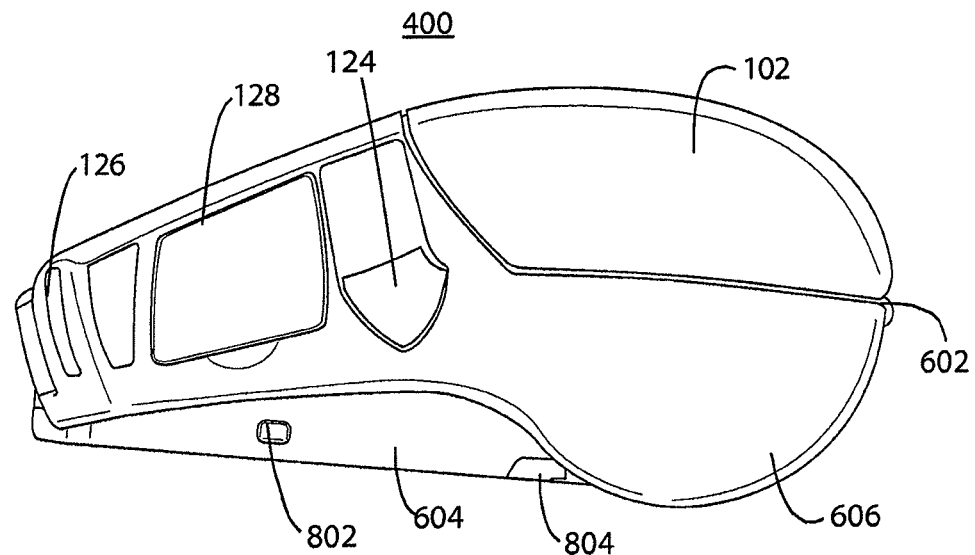
Figure 9:
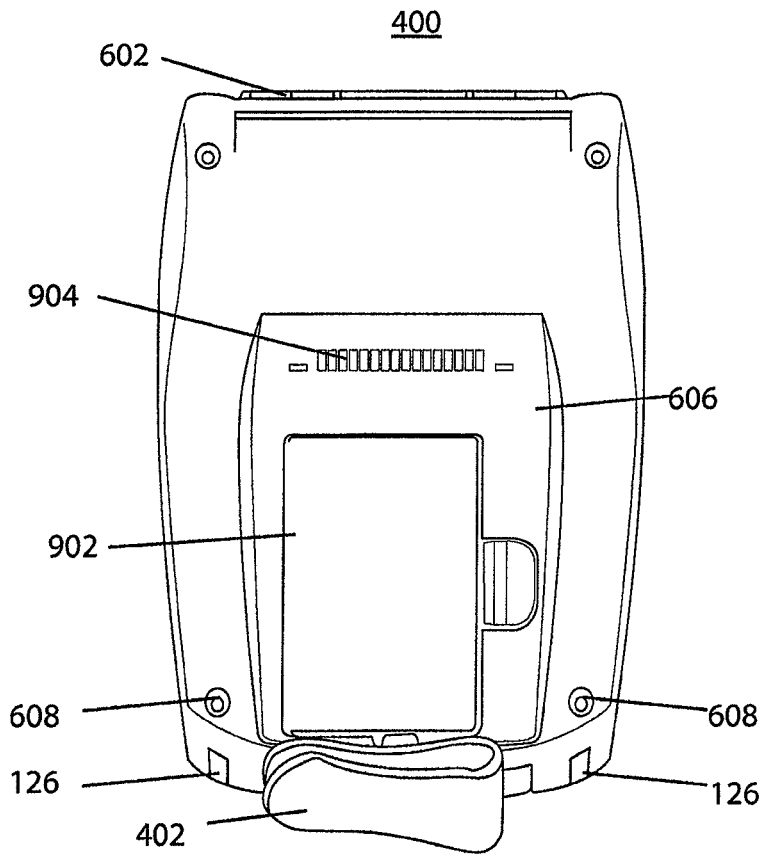
Figure 10A:
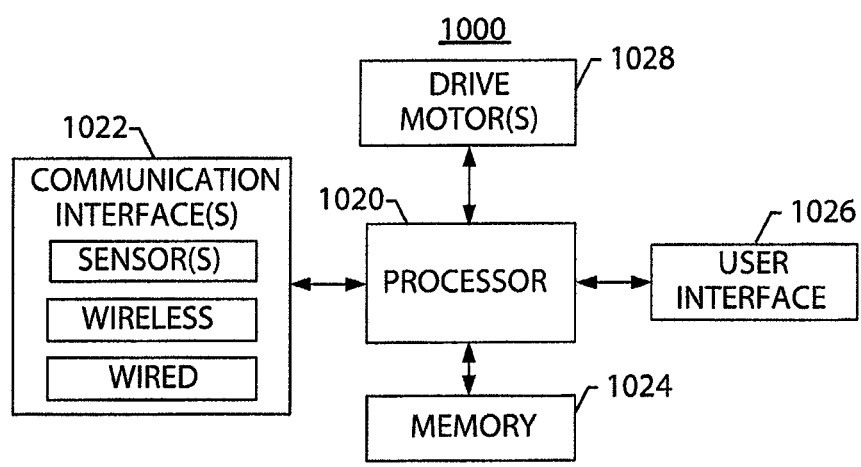
Figure 10F:
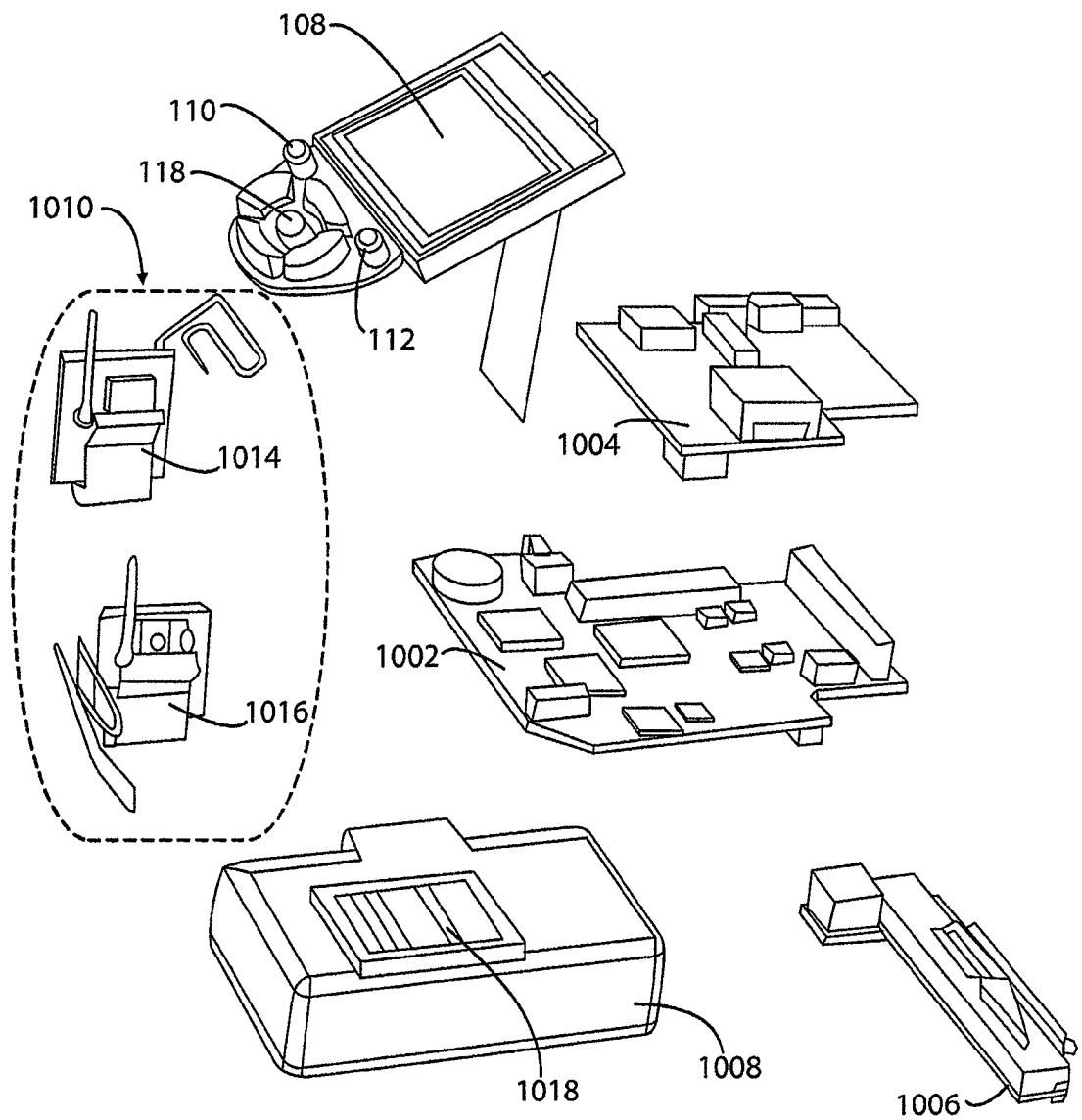
Figure 11A:
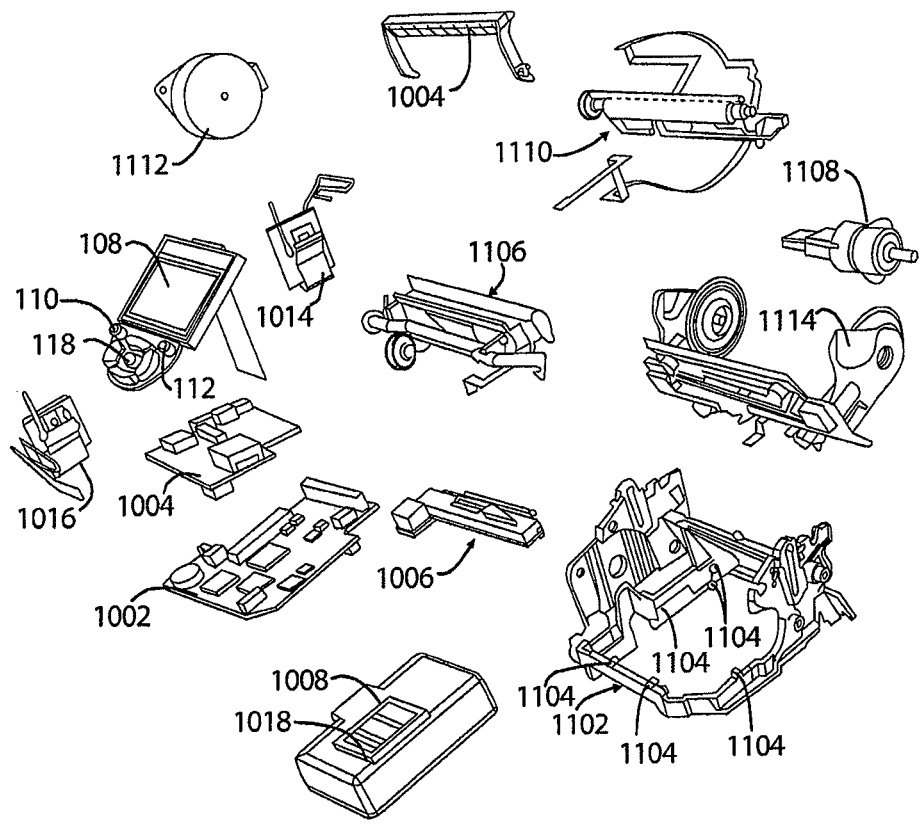
Figure 11B:
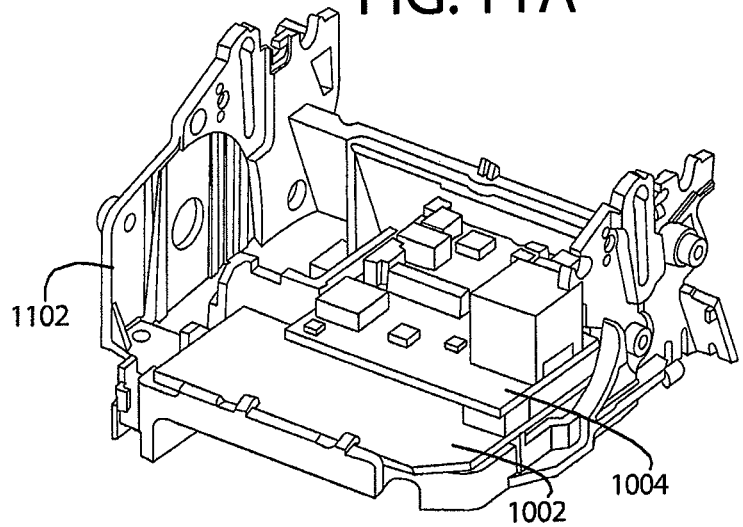
Figure 12A:
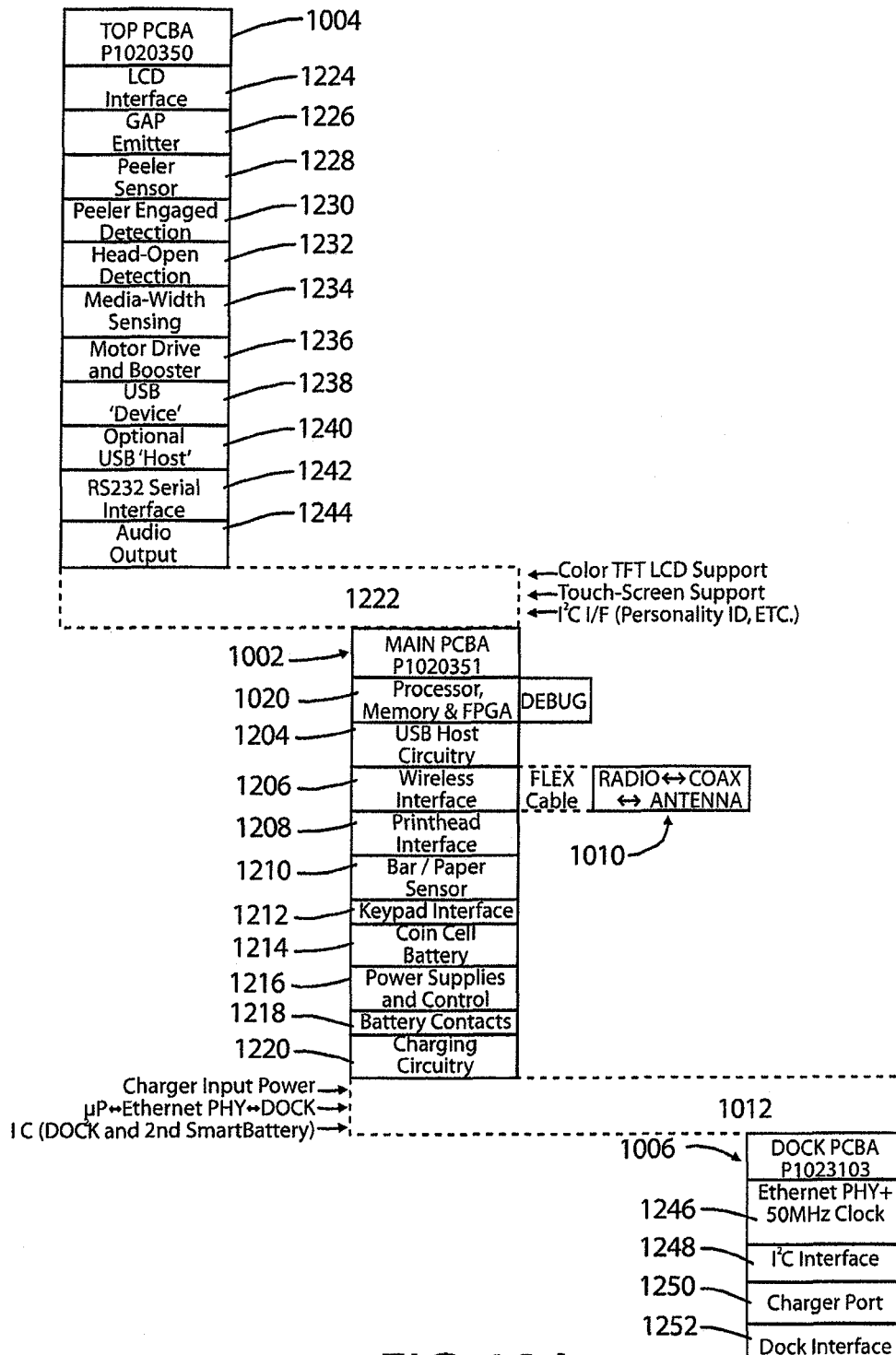
Figure 12B:
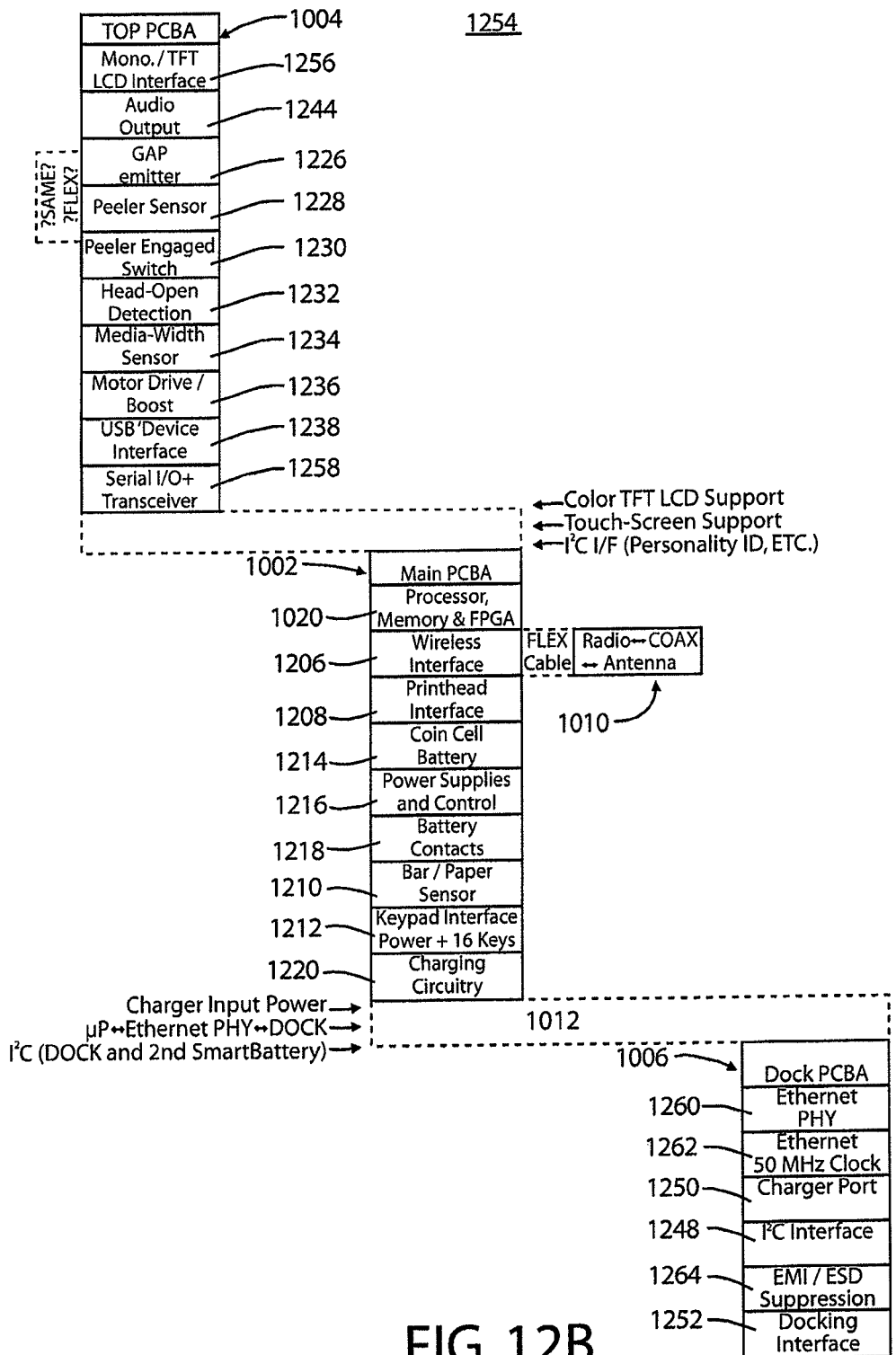
Figure 12C:
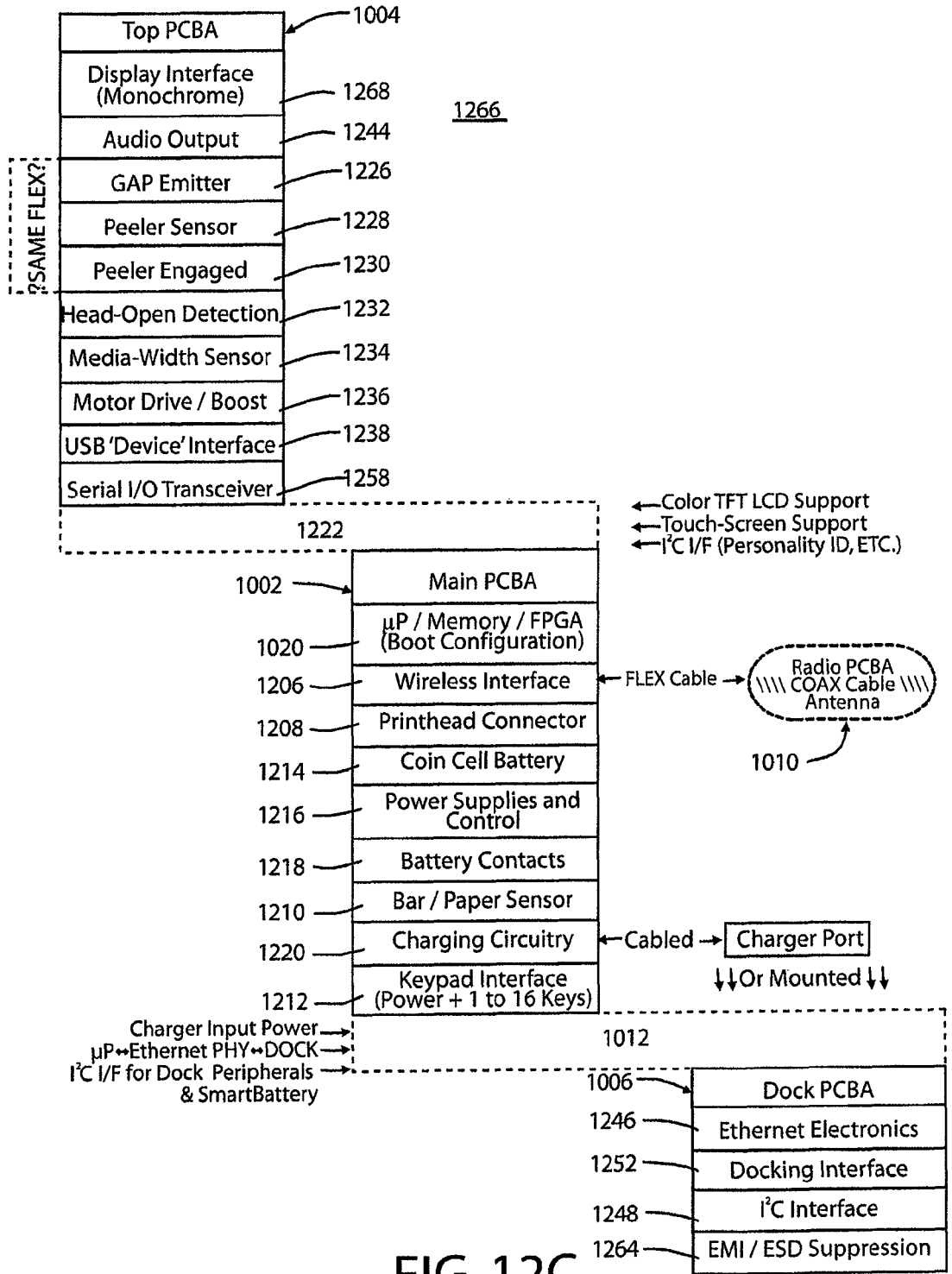
Figure 13A:
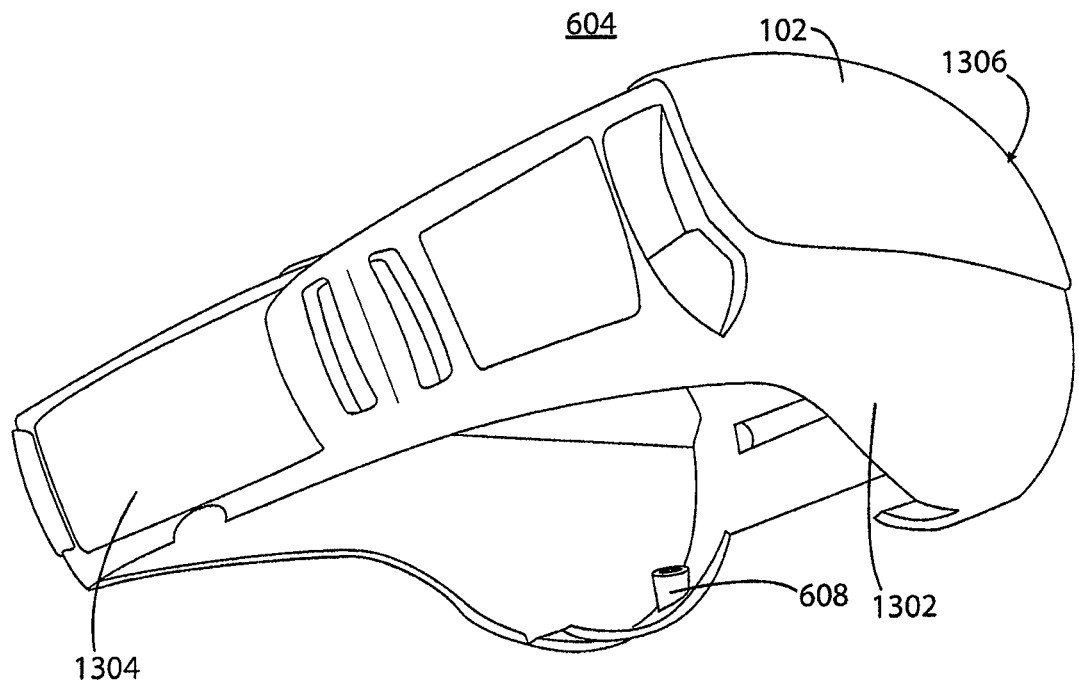
Figure 13B:
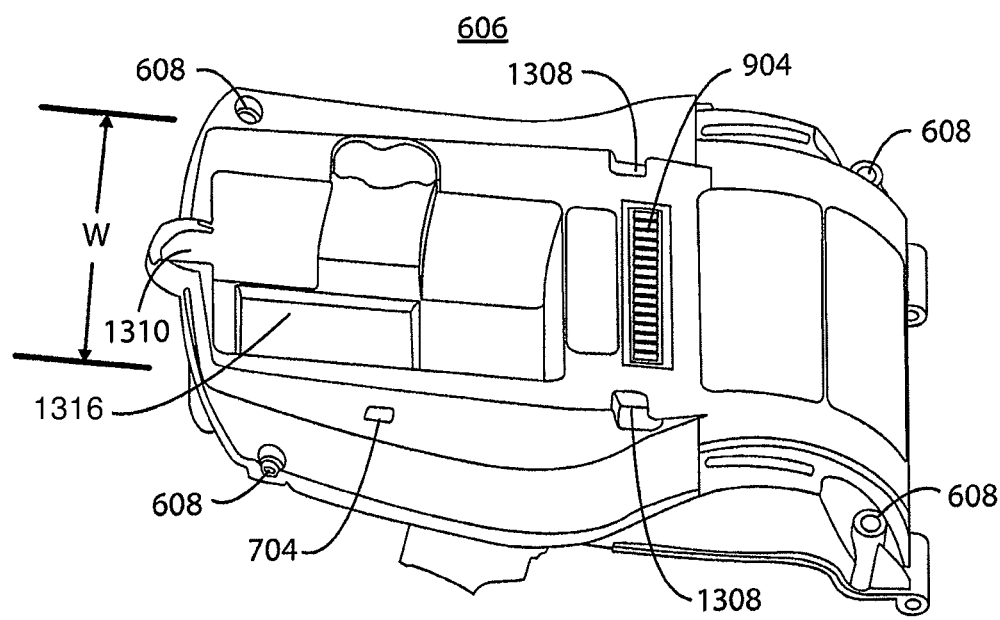
Figure 14A:
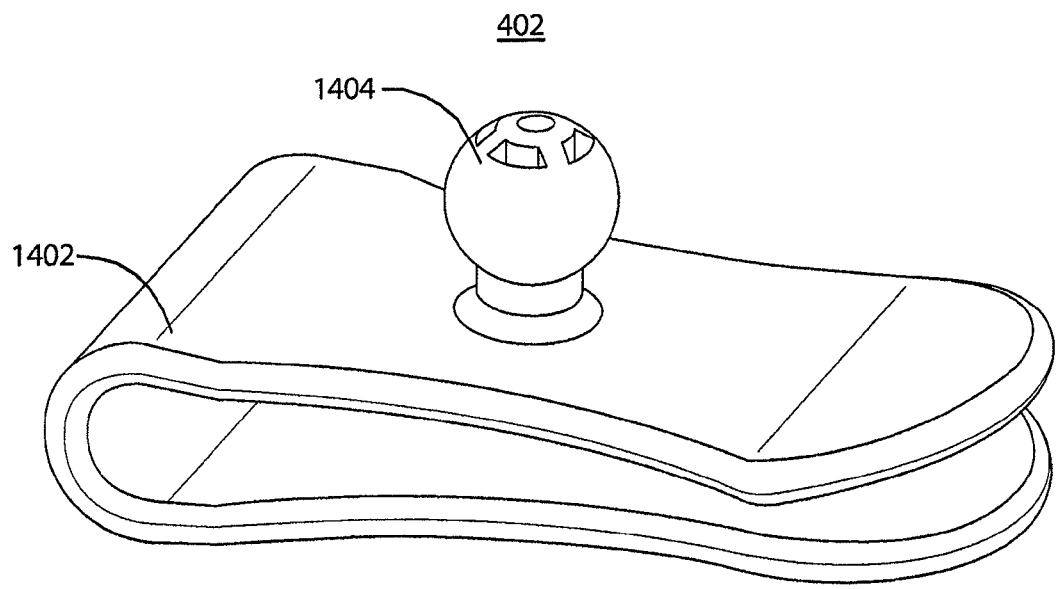

FIGS. 8A and 8B each show a right side view of embodiments of the mobile printer consistent with those discussed in connection with FIG. 4;

FIG. 9 shows a bottom view of the mobile printer discussed in connection with FIG. 4;

FIG. 10A shows an example block diagram of circuitry that may be included in some embodiments discussed herein;

FIGS. 10B-10E show various views of example of circuitry, such as that discussed in FIG. 10A, that may be included in printers that are in accordance with some embodiments discussed herein;

FIG. 10F shows an exploded view of the circuitry shown in FIGS. 10A-10E;

FIGS. 11A and 11B show exemplary portions of a housing for a printer in accordance with some embodiments discussed herein;

FIGS. 12A-12C show different examples of circuitry and other components that may be included on three of the circuit boards included in a printer in accordance with some embodiments discussed herein;

FIGS. 13A and 13B show exemplary housing portions of a printer in accordance with some embodiments discussed herein;

FIGS. 13C-13F show exemplary defining housing portions of various sizes mating with base housing portions that are at least substantially the same;

FIG. 14A shows an example removable belt clip; and

Figure 14B:
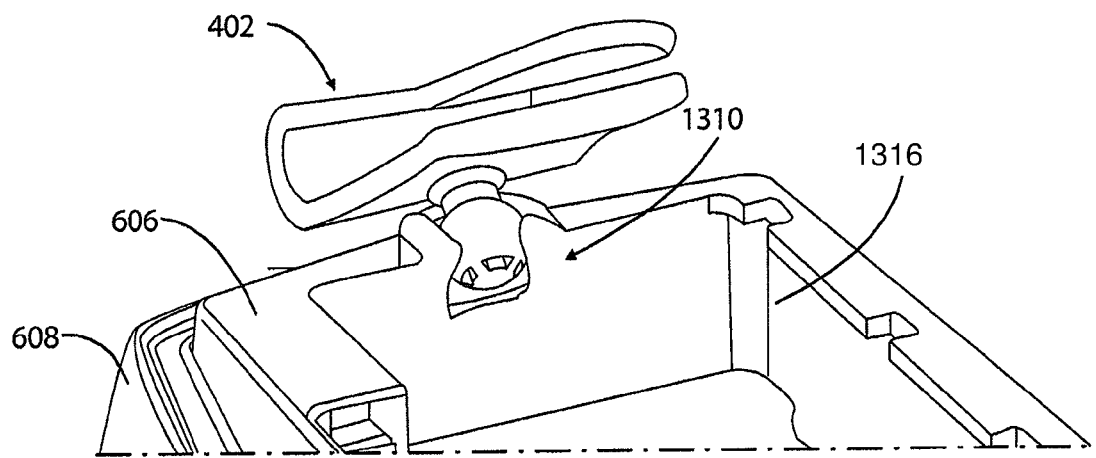

FIG. 14B shows the example belt clip from FIG. 14A installed in a printer with the battery cover removed.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Printer Platforms and User Interface Components

Figure 1:
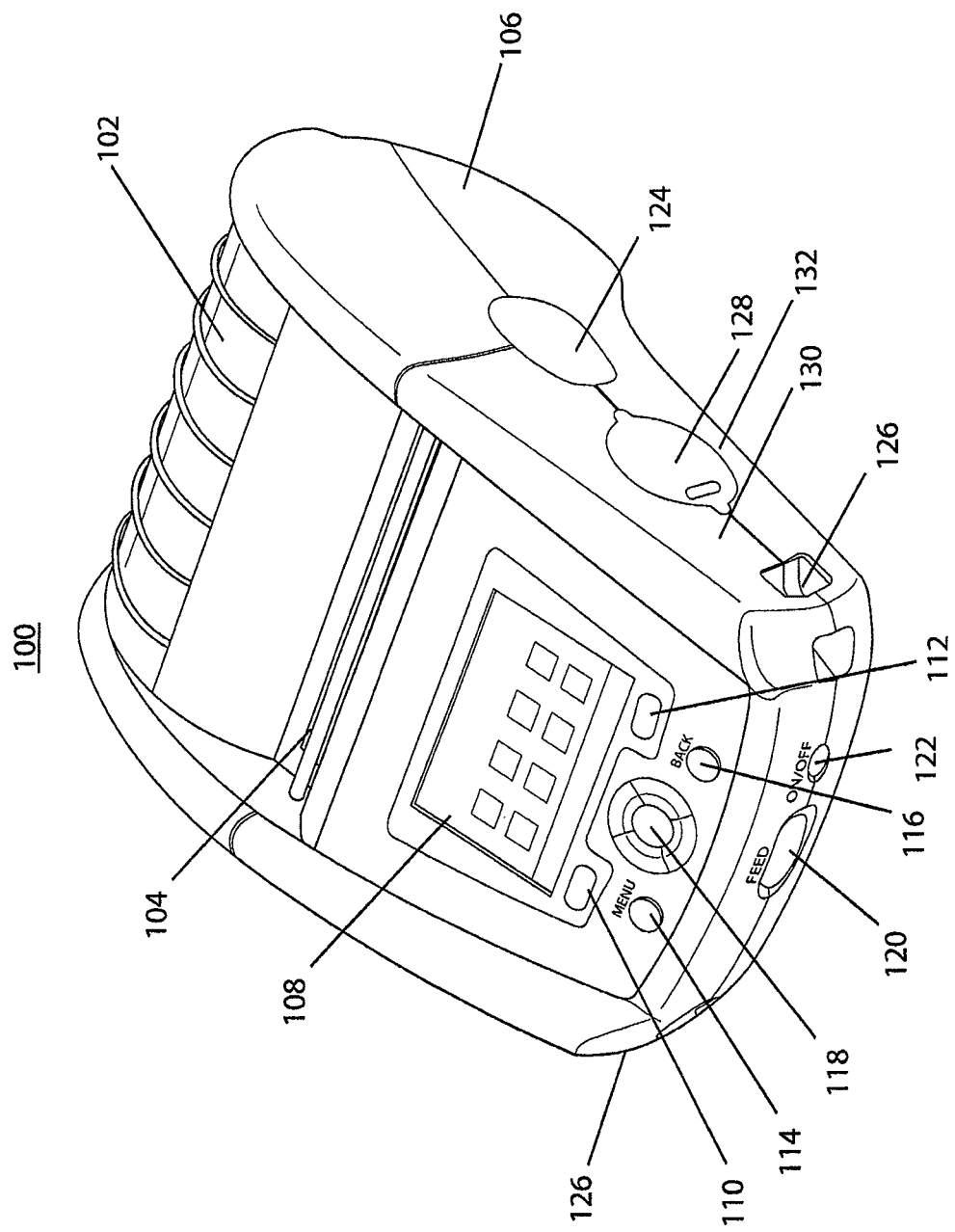
FIG. 1 shows an isometric view of a mobile printer in accordance with some embodiments discussed herein.

FIG. 1 shows mobile printer 100, which is in accordance with some embodiments of the present invention. Mobile printer 100, like some of the other exemplary printers discussed herein, can weigh less than 1.6 pounds, can have a volume of about 61 cubic inches, and can be durable enough to function properly after falling from a height of at least 5 feet. Mobile printer 100 can also be used to print user-readable indicia at, e.g., a speed of one or more inches per second. In some embodiments, the torque and/or print speed can be dynamically adjusted based upon the printing parameters selected in response to the printer's processor determining, e.g., the type of media (e.g., backless media, media with backing to be peeled, among others). Mobile printer 100 can also be configured to encode machine-readable indicia onto media.

The relatively small profile and increased durability of mobile printer 100 can be enabled by, among other things, the arrangement of the internal circuitry and/or circuit boards onto which the circuitry is mounted. For example, the circuitry of mobile printer 100 can be laid out on a plurality of circuit boards (instead of a single circuit board). Additional examples of how circuitry may be arranged on one or more circuit boards are discussed below in connection with FIGS. 10A-12C.

The media can include, for example, a number of adhesive-backed labels supported by a liner or other carrier (sometimes referred to herein as a "backing"). In RFID applications, the labels may include an RFID transponder or other type of circuitry (sometimes referred to herein as an "inlay"). A peeler (discussed further in connection with FIGS. 7-13) and/or other component(s) can be included in mobile printer 100 and may be used to separate the media from the liner after printing/encoding. The media can include a single media unit, or the media can include individual media units that are rolled together, fan folded, or otherwise assembled together, and inserted into mobile printer 100. For example, media cover 102 can open allowing mobile printer 100 to receive a single media unit, a roll of media units, a fanfold of media units, or any other suitable arrangement of one or more media units. Mobile printer 100 can then feed the media through media slot 104. In some embodiments, a tear bar or other type of cutting component (discussed below) can be incorporated near media slot 104 to help the user remove a label, receipt, or other type of media unit(s) from the roll after printing/encoding.

A peeler assembly may also be included in mobile printer 100. The peeler assembly may comprise a peel bar and/or other component(s), and be positioned proximate media slot 104. Mobile printer 100 may include gears and/or other components that are adapted to automatically engage the peeler to print media (such as, e.g., media cover 102 may be configured to latch the peel bar in a peeling position), subsequent to the peeler bar being released from its stowed or other type of non-peeling position by a user and/or mobile printer 100. The peeler can then be used to at least partially remove a label or other type of media from any type of backing, such as a media liner, after printing/encoding the media. Additional examples of threadless peelers are provided in commonly-assigned U.S. patent application Ser. No. 13/085,422, titled "LABEL PEELING, UNIVERSAL PRINTHEADS AND RELATED METHODS," which is incorporated herein in its entirety by reference.

Housing 106, including media cover 102, can be made from any suitable material and/or combinations of materials. For example, housing 106 can be made from plastic(s), rubber, metal, composite material, any other type of material, or combination thereof (such as, e.g., a rubber-infused plastic). Housing material 106 can be strong enough to protect the internal components from a fall, while still allowing wireless signals, such as those used to communicate to radiate through in at least some locations. Housing 106 is shown in FIG. 1 as having a center seam between top half 130 of the housing and bottom half 132 of the housing. Other embodiments, examples of which are discussed below (in connection with, e.g., in connection with, e.g., FIGS. 2-6B, 11A and 11B), include a seam line that allows, among other things, the bottom portion of the housing to be the same size and shape, regardless of the overall shape and size of printers. Additional examples of outer shells and other defining exterior features of printers' housings that may be used in some embodiments discussed herein are provided in connection with FIGS. 2A-8B, 13A and 13B.

Mobile printer 100 can also include one or more user input/output components, such as display 108, left button 110, right button 112, menu button 114, back button 116, navigation buttons 118, feed button 120, power button 122, and cover release button 124. Other examples of buttons, sensors and other type of user and environmental inputs may be included, some of which are discussed herein. For example, additional user inputs and/or outputs may be available to the user only when media cover 102 is open. Additional examples of printer user input components that may be included in some embodiments are discussed herein.

For example, display 108 can include components configured to receive data inputs and output a display. In some embodiments, display 108 may also include components that enable touch-sensitive functionality that enable display 108 to receive an indication from a user and output a corresponding electrical signal associated with the user's indication. The touch-sensitive components of display 108 can include, for example, capacitance sensor(s), resistance sensor(s), acoustic wave sensor(s), optical sensor(s), any other type of sensor(s), and/or combination thereof. Display 108 can also include a liquid crystal display ("LCD"), light emitting diode ("LED") display, an organic light emitting diode ("OLED") display, any other type of display, or combination thereof. Different types of displays have various advantages and disadvantages relative to each other. For example, as shown in FIG. 2A, a 2.1 inch OLED display may have a relatively larger viewing angle than a 2.1 inch LCD. The relatively larger viewing angle in combination with the shape of the printer's housing (e.g., the straight, but angled portion of the printer's "whistle shape") can enable the printer's display to be more easily viewed by a user across many applications. For example, the shape of the printer can create a slope having an angle "α", wherein the shape of the printer in combination with the viewing angle of display 108 may allow display 108 to be viewed while worn by a user (e.g., on a lanyard or belt clip, such as those discussed below) and/or set atop a table. For example, "α" may include any angle between 20-70 degrees, among others.

However, as known to those skilled in the art, OLED displays are currently more expensive than comparable LCDs. Other examples of displays that may be used by some embodiments discussed herein, include an electronic paper display ("EPD," sometimes referred to as electronic ink or e-ink) or other type of bistable display(s). Power consumption, brightness, readability (in sunlight, darkness, etc.), expected life span, and other factors may also differ among different types of displays and impact the best display to be used as display 108 depending on the intended usage of mobile printer 100. In some embodiments, an ambient light sensor and/or other type of sensor can be integrated into the display and/or other portion of printer 100, such as in and/or near the peeler bar or media cover. The one or more sensors can be used to, for example, adjust the brightness of the display, detect a label that needs to be removed from the peel bar, and determine when printer 100 is moving, among other things.

Display 108 can be configured to present an icon based menu and/or any other type of menu hierarchy. Among other things, display 108 can be adapted to display Asian-language fonts in relatively high resolution. Various fonts, firmware and/or other data may be downloaded onto printer 100 (some examples of which are discussed further below).

In some embodiments, display 108 may only function as an output display component and be unable to function as an input component. For example, display 108 may lack a functioning touch-sensitive input component and/or the appropriate software/hardware/firmware necessary to enable the touch-sensitive input component.

Regardless of whether display 108 includes a touch sensitive component that displays user-selectable buttons and/or other input component(s), mobile printer 100 can include "soft" keys, such as left button 110 and right button 112, which are hardware-based keys (as opposed to software-based keys presented by a touch-sensitive display) that can be used to select options presented by display 108. In some embodiments, portions of the screen of display 108 can be dedicated to and associated with left button 110 and/or right button 112. For example, the area of display 108 located immediately above left button 110 can be used to present an option that can be selected in response to left button 110 being depressed. Likewise, the area of display 108 located immediately above right button 112 can be used to present another option that can be selected in response to right button 112 being depressed. The options presented in the screen areas associated with left button 110 and/or right button 112 can be dynamic and change based upon the current display, allowing left button 110 and right button 112 to provide flexible navigation of the menu hierarchy. Additional examples of printer user interface components that may be used in some embodiments discussed herein are provided in connection with, e.g., FIGS. 3A-3N.

Mobile printer 100 can also include menu button 114. Internal circuitry (e.g., the processor and/or other components, such as those discussed in connection with, e.g., FIGS. 10A-12C) of mobile printer 100 can be configured to, for example, present a main menu or other type of display on display 108 in response to menu button 114 being depressed. Software and/or firmware, which include coded machine-readable instructions for executing the functionality of mobile printer 100, can be stored in memory or any other type of computer readable media device included in mobile printer 100. For example, mobile printer 100 may include 128 megabytes of memory, 256 megabytes of memory, or any other suitable amount of removable or embedded memory in the form of nontransitory volatile and/or non-volatile storage (e.g., flash memory, magnetic disk memory, etc.).

Back button 116 can cause the internal circuitry to present a display that is higher up a menu hierarchy of mobile printer 100. In other embodiments, back button 116 (or another button which is not shown) can be used to physically "back-up" or otherwise control the movement of the media being printed/encoded by mobile printer 100. In yet other embodiments, back button 116 (and/or any other component of mobile printer 100) can have dynamic functionality, in that selecting back button 116 causes mobile printer 100 to respond differently depending on a range of variables. For example, back button 116 may cause display 108 to advance up the menu hierarchy while media cover 102 is in a closed position (as shown in FIG. 1) and cause the printing media to back-feed while media cover 102 is in an open position, or vice-versa.

Navigation buttons 118 are shown in FIG. 1 as comprising four directional buttons and a center button. Navigational buttons 118 can enable a user to, for example, move a cursor among and/or select one or more options presented by display 108. Navigational buttons 118 can also provide an intuitive interface for allowing a user to move to and/or select an option using fewer key presses.

FIG. 2B shows another example design for navigational buttons 118 that includes space between each of the directional buttons. By separating the directional buttons as shown in FIG. 2B, unintentional and multiple button presses (e.g., the accidental pressing of two buttons at once) can be reduced or avoided. FIG. 2C shows an example of how the center button and outer edges of the directional buttons can be raised to allow relatively smaller buttons to be used (as compared to buttons that are not raised) without negatively impacting the user's experience and/or interactions with mobile printer 100.

Figures 3J, 3K:
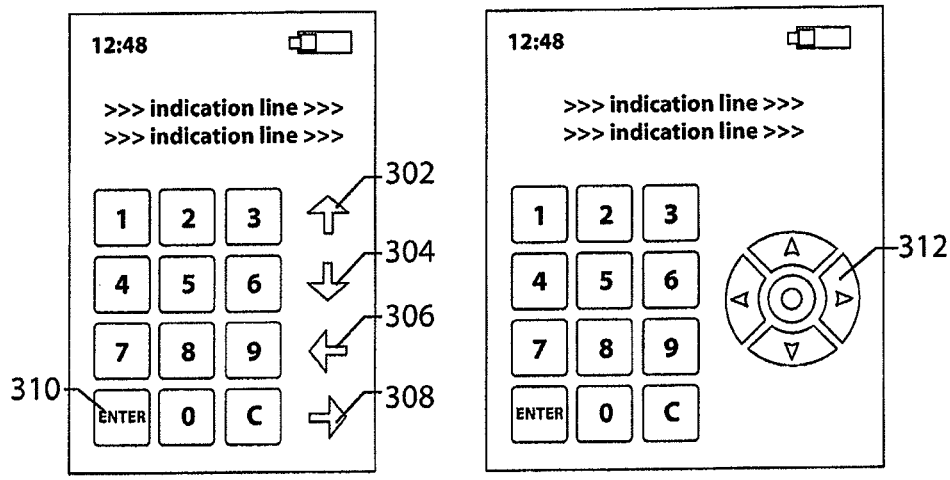
Figure 3L:
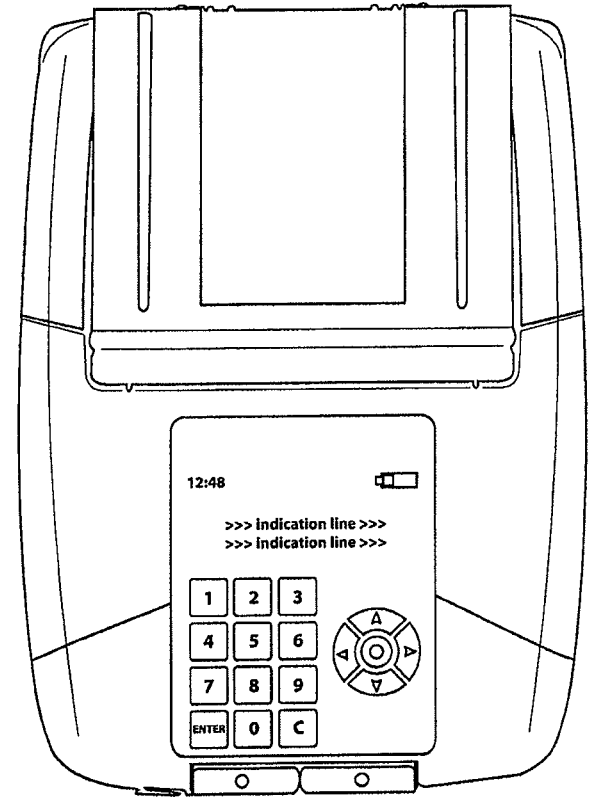
Figure 3M:
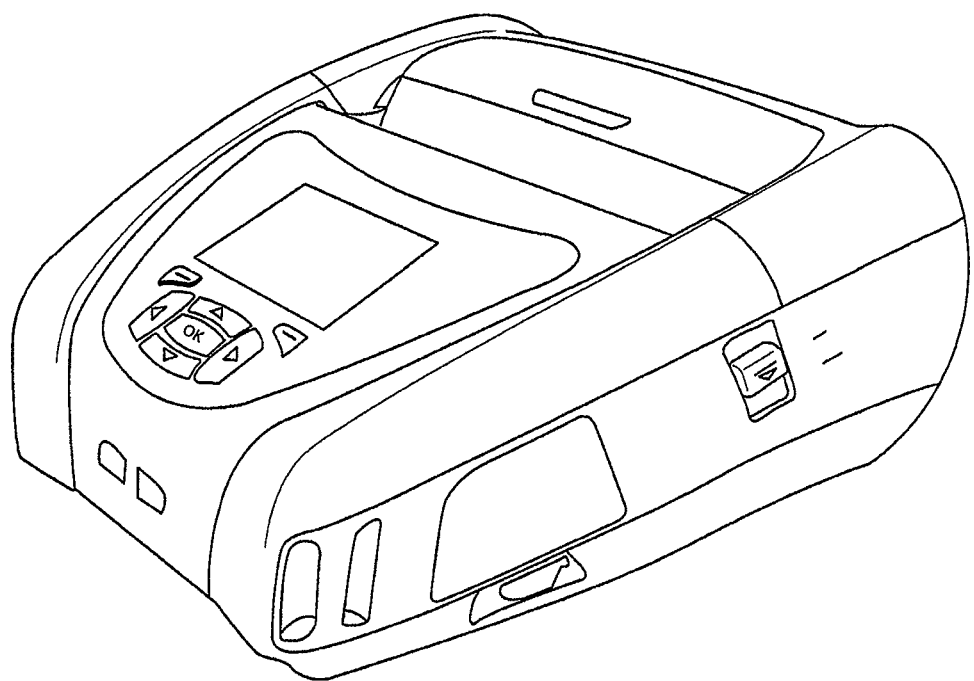
FIGS. 3M and 3N show isometric views of two other printers having differing display screens and arrangements of input buttons in accordance with some embodiments discussed herein.
Figure 3N:
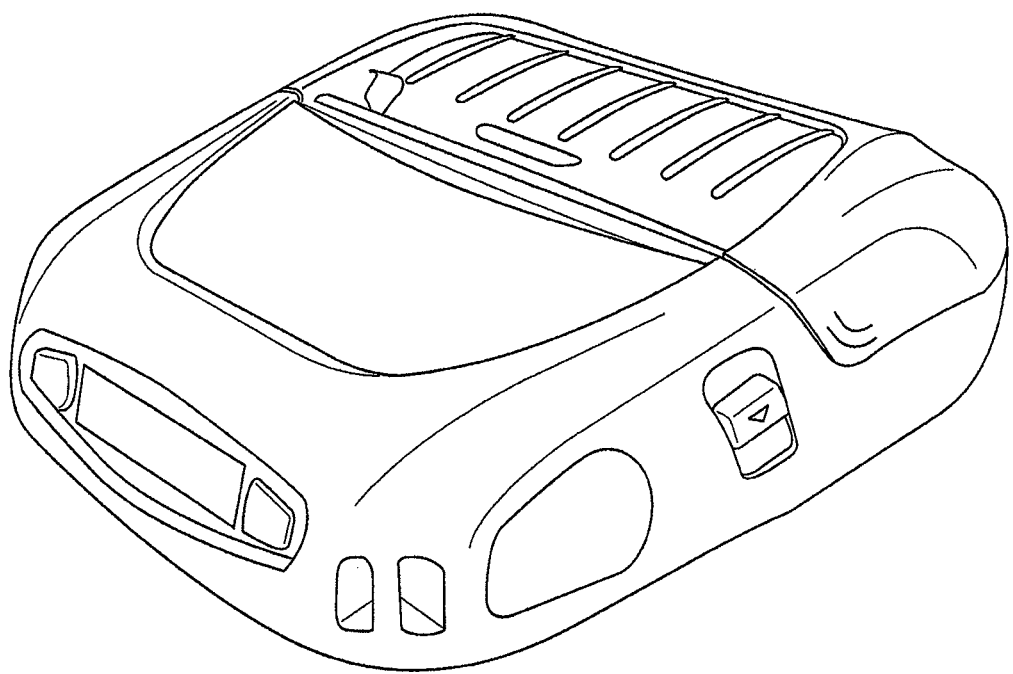

FIGS. 3A-3N show alternative arrangements of navigational buttons 118 that can be used with mobile printer 100. FIG. 3N also shows additional examples of arrangements of buttons 118, soft buttons and a display, such as display 108.

FIGS. 3J-3L show examples of a touch sensitive display that may be used to replace navigational buttons 118. For example, as shown in FIG. 3J, navigational buttons 118 may be replaced with arrow icons 302, 304, 306 and 308 and enter button 310. In this regard, the display component shown in FIG. 3J can associate a user touching the screen in proximity to arrow icons 302, 304, 306 and 308 and enter button 310 in a manner similar to determining a user has depressed one of navigational buttons 118 discussed above. FIG. 3H shows another example in which icon 312 can be used to replace navigational buttons 118. Touching the various parts of icon 312 may cause a printer and/or other devices to respond similar to or the same as the printer and/or other device would respond to one or more of navigational buttons 118 being depressed. FIG. 3I shows an example of the display from FIG. 3H incorporated into a mobile printer in accordance with some embodiments discussed herein. In yet other embodiments (not shown), navigational buttons 118 can be replaced or supplemented with a joystick, track pad, click wheel, trackball, any other type input component, or combination thereof Returning to FIG. 1, feed button 120 can be used to activate one or more rollers and feed media into the printing components of mobile printer 100. For example, when the media is supported by a liner, feed button 120 can assist a user in advancing the liner through printing components. Feed button 120 may also be used to help the user remove excess media, advance the media manually, and/or remove jammed media, just to list a few examples.

Mobile printer 100 can be powered ON and OFF using power button 122. In some embodiments, power button 122 can be used to cause mobile printer 100 to enter or exit a standby mode. For example, in response to power button 122 being depressed for less than a predetermined period of time (e.g., 5 seconds), mobile printer 100 can either enter or exit standby mode (depending on, e.g., whether or not mobile printer 100 is currently in an active or standby mode). But in response to power button 122 being depressed for more than 5 seconds, mobile printer 100 can power OFF (if ON). In some embodiments, the circuitry of mobile printer 100 can be configured to automatically power OFF after a predetermined period of time or in response to determining the battery power has dropped below a predetermined threshold. Mobile printer 100 may also be configured to power ON automatically, for example, in response to a print command being issued by another device, such as a mobile terminal. In some embodiments, mobile printer 100 can be configured to automatically enter and/or exit a stand-by or other power-saving mode (including dimming the display screen, turning OFF wireless components, and/or execute other power reduction configuration settings). For example, a power-saving mode may be entered or exited after a predetermined period of time has elapsed and/or an environmental trigger has been detected (e.g., light detected by an ambient light sensor, movement detected by a jiggle switch, accelerometer and/or other type of movement sensor, etc.).

Cover release button 124 can be used to unlock and/or open media cover 102. When media cover 102 is open, media can be loaded into mobile printer 100, media jams can be fixed, ribbon or other printing components can be replaced, the peeler bar can be released to engage the media, etc.

The relatively small size of mobile printer 100 allows mobile printer 100 to be attached, mounted, or otherwise physically coupled to a number of devices. For example, mobile printer 100 can be attached to a fork lift (or other warehouse apparatus), automobile (e.g., police car), healthcare device, shopping cart, belt loop, belt and/or lanyard, among other things. To facilitate its mechanical or other type of physical coupling to another apparatus, mobile printer 100 can include channels 126, which are adapted to receive a mounting component (e.g., lanyard, shoulder strap, belt, or other type of tether), locking component, and/or any other type of apparatus(es). Other mounting components, including a removable belt clip (such as those discussed in connection with FIGS. 4-8A and 13B) and/or mounting components (such as those discussed in connection with commonly-assigned U.S. patent application Ser. No. 13/085, 431, titled "MOBILE PRINTER NETWORKING AND INTERFACING," which is incorporated herein by reference in its entirety).

Protective cover 128 can be used to prevent water, dirt and other elements from entering one or more electrical coupling components of mobile printer 100. For example, one or more universal serial bus ("USB") ports, mini-USB ports, serial enhanced security ports, Ethernet ports, optical ports, and/or any other type of input components, output components and/or input/output components may be located behind protective cover 128. Protective cover 128 can be removed and/or opened to access the protected component(s). The protected component(s) can also incorporate, for example, strain relief technology. Among other things, strain relief component(s) may help reduce and/or eliminate strain placed on internal circuitry by a universal serial bus ("USB") and/or other input/output cables. The strain can result from a connection made to a second printer, portable data terminal, scanner, credit card reader, personal computer, etc. For examples of strain relief components are provided in commonly-assigned U.S. Pat. No. 7,066,754, titled "PRINTER CABLE AND ASSOCIATED STRAIN RELIEF COLLAR FOR CREATING A RUGGEDIZED CONNECTION FOR AN ELECTRICAL TERMINAL OF A PRINTER AND ASSOCIATED METHODS THEREFORE," both of which are incorporated by reference herein in their entireties by reference.

As another example, the strain relief technology discussed in the U.S. Pat. No. 7,066,754 can be modified in accordance with some embodiments discussed here to be smaller and utilize a twist lock attaching mechanism that is configured to wed to USB and various other cables. For example, the strain relief component may include two receptacles adjacent to each other (serial and USB) that accept the same twist lock part that is attached to the particular cable.

Figure 4:
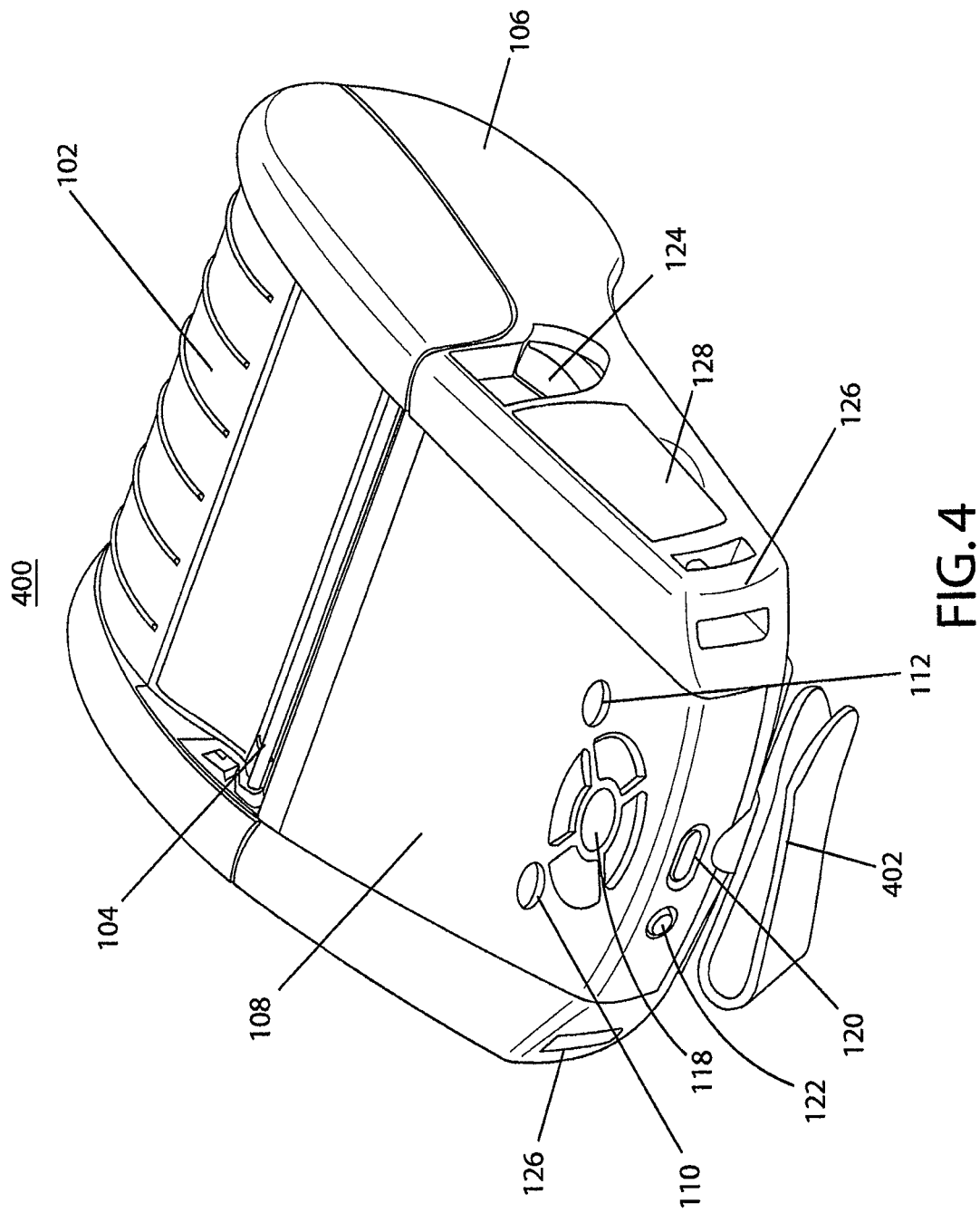
FIG. 4 shows an isometric view of another printer in accordance with some embodiments discussed herein.

FIG. 4 shows printer 400, which includes components similar to or the same as those discussed above in connection with mobile printer 100. To avoid overcomplicating the discussion, like reference numbers refer to like elements throughout the drawings. (Although a display screen is not shown in FIG. 4, reference number 108 points to a portion of housing 106 that may be adapted to receive any type of display or other type of user interface, such as those discussed in connection with FIGS. 2A-3N.)

In some embodiments, the portion of printer 400's housing where display 108 may be integrated can be formed from one or more different materials than other portions of the printer's housing. For example, the side walls of the housing (such as the portions where channels 126 are located) can be formed from and/or comprise an injection molded plastic, and the portion for display 108 can comprise die cut rubber. When manufacturing printer 400, for example, plastic for the housing can be injected molded around the die cut rubber, which may allow the same injection mold to be used for printers that have different sized and/or types of input components (e.g., different types of display screens, navigation button arrangements, etc.). In some embodiments, a rubber, plastic and/or other type of overmold (discussed further in connection with, e.g., FIGS. 13A and 13B) can be applied to one or more of the printer's side walls and/or other components. Allowing the same molds to be used for multiple products can reduce manufacturing and machining costs sometimes associated with providing various product options to customers. In other embodiments, rather than place display 108 into rubber, the portion of the printer's housing that receives display 108 can be plastic and/or any other type of material. In addition to die cut rubber that receives display 108 and the base housing portion, other design aspects, some examples of which are discussed herein in connection with circuitry, may allow similar or the same printer components to be used across different types of mobile printers, desktop printers and other devices in accordance with some embodiments of the present invention.

Printer 400 includes clip 402, which may enable printer 400 to be attached to a user's belt or belt loop. In some embodiments, clip 402 may swivel on a ball hinge or may remain in a fixed position relative printer 400. Housing 106 of printer 400 can be molded or otherwise adapted to receive clip 402 with or without another component. Some embodiments of housing 106, such as that shown in FIG. 4, lacks a seam line that runs between the upper housing portion and the lower housing portion. Similarly, the seam line between the two housing portions may not runs through the ball joint or other type of belt clip receptacle. Housing 106 can also be configured to directly receive clip 402 without sacrificing much, if any, strength of the connection, even absent another component. Clip 402 can be removable and/or replaced with one or more other types of attaching components. For example, a magnetic attaching component could be located where clip 402 is shown in FIG. 4, and used to attach printer 400 to a metallic surface. Additional examples of belt clips that may be used in combination with some embodiments discussed herein are discussed in connection with, e.g., FIG. 13B.

Figure 5:
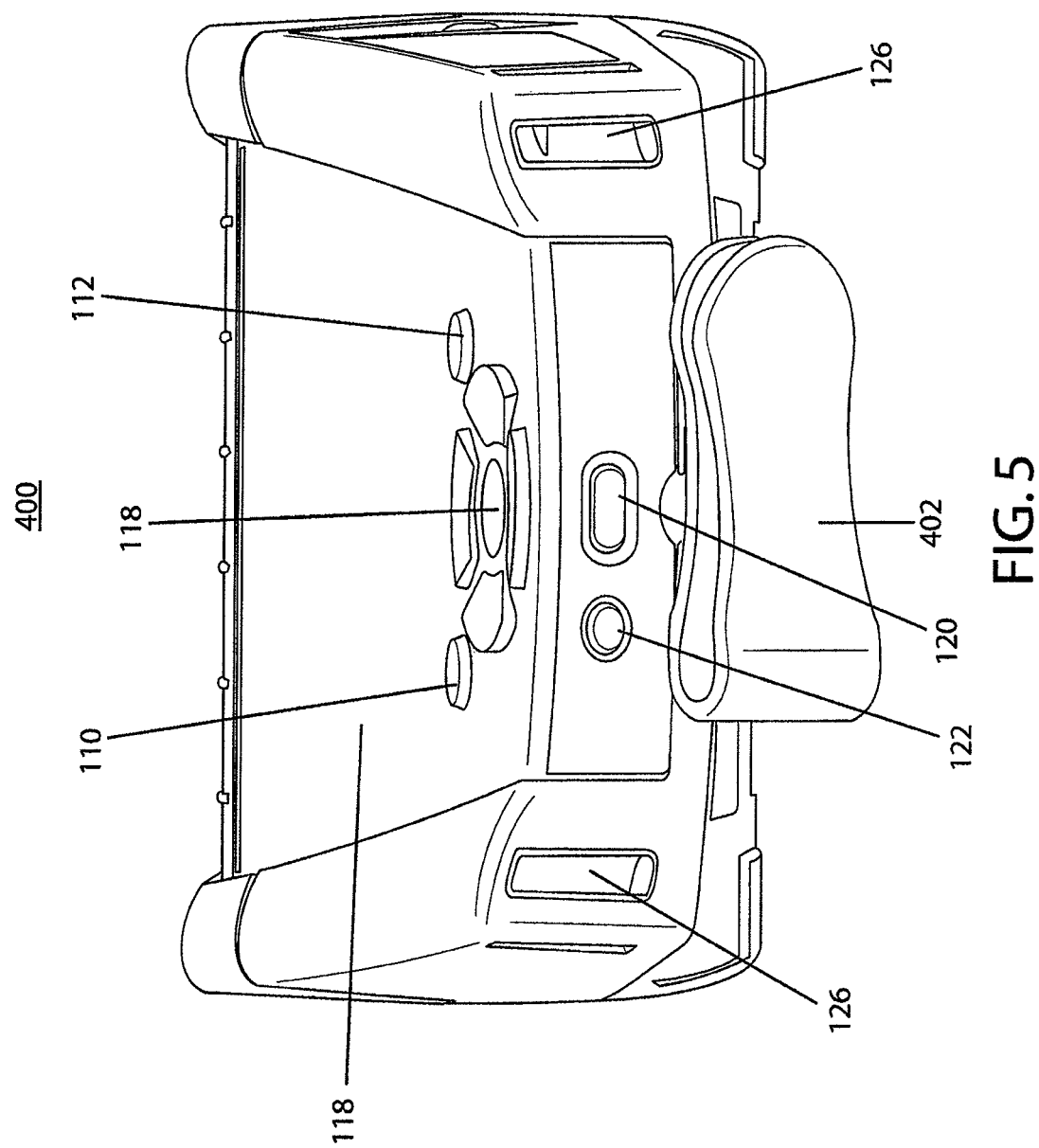
FIG. 5 shows a front view of the mobile printer discussed in connection with FIG. 4.

FIGS. 5-9 show different views of printer 400. For example, FIG. 5 shows a front view of printer 400. One skilled in the art may realize from the discussion herein that as used herein, the relative "front", "back", "top", "bottom", "right" and "left" would be understood to one of ordinary skill in the art in view of the description of the drawings FIGS. 5-9 that are respectively referred to herein as "front", "back", "left", "right" and "bottom" side views.

Figure 6:
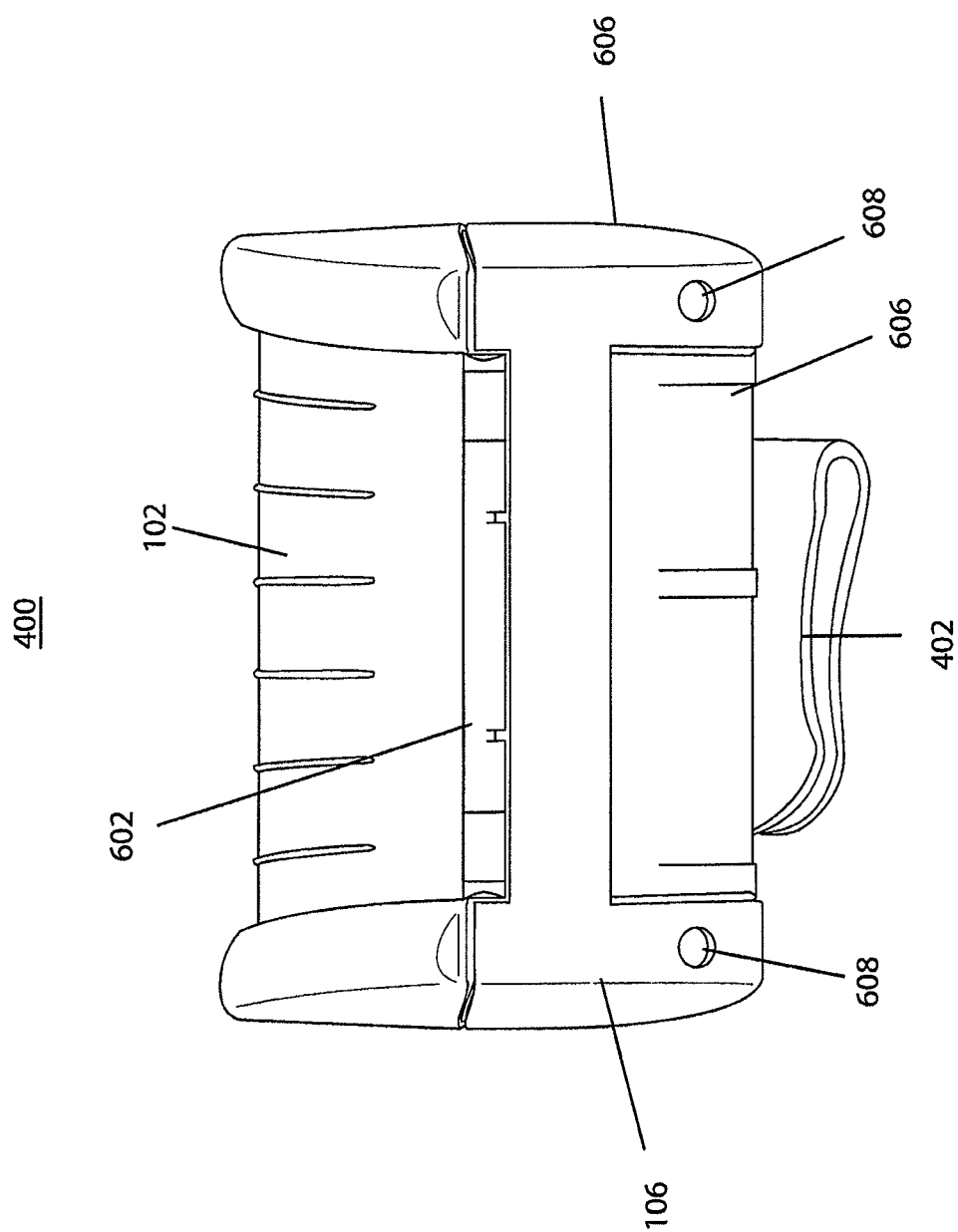
FIG. 6 shows a back view of the mobile printer discussed in connection with FIG. 4.

FIG. 6 shows a back view of printer 400. Hinge 602 can include a spring or other mechanism that allows media cover 102 to be driven open in response to a latch being released. For example, cover release button 124 can be adapted to release such a latch when depressed by a user. When media cover 102 is open, media can be loaded into printer 400, media jams can be corrected, print ribbon or other consumable printing components can be replaced, among other things. Cover release button 124 can also be configured to release and/or drive a peel bar from a non-peeling position to a ready and/or peeling position. Additional examples of peel bars' functionality, including examples of the non-peeling, ready and peeling positions, are provided in commonly-assigned U.S. patent application Ser. No. 13/085,422, titled "LABEL PEELING, UNIVERSAL PRINTHEADS AND RELATED METHODS," which was incorporated herein in its entirety by reference.

In other embodiments, the peel bar can function independent from cover release button 124. For example, cover release button 124 can be configured to open media cover 102 without causing the peel bar to be released from the latched position.

In some embodiments, cover release button 124 may be configured to function differently depending on how it is utilized (e.g., depressed). For example, when cover release button 124 is depressed partially, media cover 102 may be opened, and when cover release button 124 is depressed further (e.g., all or most of the way down), the peel bar can be released to a ready and/or peeling position.

The back view of printer 400 also shows that its housing was assembled from two pieces, namely, defining portion 604 and base portion 606. Defining portion 604 meets base portion 606 underneath printer 400 (as opposed to along the lateral sides such as housing 106 of mobile printer 100). FIGS. 13A and 13B, discussed below, show defining portion 604 separated from base portion 606.

Hinge 602 can attach media cover 102 to defining portion 604 or base portion 606, and fasteners 608 (which may be screws and/or any other type of mechanical fasteners) can attach defining portion 604 to base portion 606. For example, FIGS. 13C-13F show an example base portion 606 that is configured to receive media cover 102 after being attached to defining portion 604. In some embodiments, the circuit board(s) of mobile printer 400 can be removed from (e.g., slid out of) housing 106 after base portion 606 is separated from defining portion 604. Each portion or subportion(s) of printer 400's housing can be constructed from any type of material, and may have a varying degree of transparency or opaqueness. For example, media cover 102 can be transparent, while the rest of the housing can be opaque.

FIG. 7 shows a left side view of printer 400, which includes protective cover 702 and alignment cavity 704. Similar to or the same as protective cover 128, protective cover 702 may be removed to expose one or more input, output, and/or input/output components that enable a power source, peripheral device, accessory device, network device, and/or other apparatus to be coupled with the circuitry of printer 400. In some embodiments, printer 400 can be configured to accept and/or work with accessories common to other types or models of devices. For example, a battery charger may be coupled to a port behind protective cover 702 and used to charge the battery pack of printer 400.

Alignment cavity 704 can be used to facilitate the proper electro-mechanical coupling of printer 400 with one or more accessory devices. For example, a docking station (sometimes referred to more generally herein as a "dock"), charging station, or mobile palette (such as, e.g., a modified or existing Route Palette currently sold by Zebra Technologies Corp.) may define a protrusion that corresponds with and fits into cavity 704. As referred to herein, a "charging station," refers to an apparatus that can function as a source of power for charging the batteries of a mobile or other type of printer without facilitating data communications between the printer and a networked device. A "docking station," as used herein, refers to an apparatus that can receive and electrically couple with a printer, function as a source of power to charge the printer's batteries, and facilitate data communications between the printer and a host device (e.g., provide Ethernet communications to a network server). In some embodiments, a docking station may be associated with a fixed physical location that is known to the host device and can be used to determine the location of printer 400. Example docking stations are shown and discussed in commonly-assigned U.S. patent application Ser. No. 13/085,431, titled "MOBILE PRINTER NETWORKING AND INTERFACING," which was incorporated herein by reference in its entirety.

FIGS. 8A and 8B show two different example right side views of printer 400, which are both shown as including cavity 802. Cavity 802 may be a detent adapted to receive a coupling mechanism, and may be the same as or similar to cavity 704 in design, functionality and/or application. In other embodiments (not shown), cavity 802 can take a different shape and/or form to cause printer 400 to be aligned in a particular manner relative to, e.g., a docking station or other apparatus. For example, notch 804 of FIG. 8B is an example of another type of receptacle that may be configured to act as a mechanical connection interface that is used to align and/or otherwise enable printer 400 to mate with an accessory device. Additional examples of notch 804 and example operations are provided in commonly-assigned U.S. patent application Ser. No. 13/085,431, titled "MOBILE PRINTER NETWORKING AND INTERFACING," which was incorporated herein by reference in its entirety.

In some embodiment, cavities 504, 602 and/or notch 804 may operate to mechanically align printer 400 in a desirable presentation manner when printer 400 is docked onto a docking station and/or mated with any other apparatus. By being properly aligned and coupled with a docking station, for example, the location of printer 400 may be determined based on the docking station's known location.

FIG. 9 shows a bottom view of printer 400, which includes battery cover 902 and electrical contacts 904. Electrical contacts 904 may be part of a communications interface discussed herein. Electrical contacts 904 can be configured to work together as a single electrical connector. In other embodiments, one or more of the electrical contacts shown in FIG. 9 can be incorporated into a cable and/or any other type of connector. For example, electrical contacts 904 can be a single 16-pin connector that can allow printer 400 to have wired network communications while charging its battery from a mains and/or other power source. Examples of the 16-pin and other types of connectors are provided in commonly-assigned U.S. patent application Ser. No. 13/085,431, titled "MOBILE PRINTER NETWORKING AND INTERFACING," which was incorporated herein by reference in its entirety.

Electrical contacts 904, like other electrical components discussed herein, can be coupled to internal circuitry, such as the circuitry 1000 discussed in connection with FIG. 10A. FIGS. 10A-10F show a more detailed example of circuitry in accordance with some embodiments. Because some applications of mobile printers may benefit from the printer being relatively small, light and rugged, some embodiments discussed herein may include the printer's internal circuitry being split among multiple circuit boards as shown in FIGS. 10A-10F.

Circuitry

FIG. 10A shows a block diagram of example circuitry 1000 that may be included in a printer in accordance with some embodiments discussed herein, including printers 100 and 200 discussed above. Circuitry 1000 may be included in a desktop, mobile and/or any other type of printer. As shown in FIG. 10A and in accordance with some embodiments, circuitry 1000 includes various means, such as processor 1020, memory 1024, communication interface 1022 and user interface 1026 that can be configured to perform the various functions herein described. These means of circuitry 1000 as described herein may be embodied as, for example, hardware elements, including control circuitry (e.g., processor 1020, including any suitably programmed processor and/or combinational logic circuit, among other things), a computer program product comprising computer-readable program instructions (e.g., software/firmware) stored on a nontransitory computer-readable medium (e.g., memory 1024) that is executable by the printer's other circuitry (e.g., processor 1020), or some combination thereof.

Processor 1020 may, for example, be embodied as various means including one or more microprocessors with accompanying digital signal processor(s), processor(s) without an accompanying digital signal processor, one or more coprocessors, multi-core processors, controllers, computers, various other processing elements including integrated circuits such as, for example, an ASIC (application specific integrated circuit) or FPGA (field programmable gate array), or some combination thereof. Accordingly, although shown in FIG. 10A as a single processor, in some embodiments processor 1020 comprises a plurality of processors and/or any other type of control circuitry. The plurality of processors, for example, may be embodied on a single computing device or may be distributed across a plurality of computing devices collectively configured to function as circuitry 1000. The plurality of processors may be in operative communication with each other and may be collectively configured to perform one or more functionalities of circuitry 1000 as described herein. In an example embodiment, processor 1020 is configured to execute instructions stored in memory 1024 and/or that are otherwise accessible to processor 1020. These instructions, when executed by processor 1020, may cause circuitry 1000 to perform one or more of the functionalities of circuitry 1000 as described herein. As such, whether configured by hardware, firmware/software methods, or by a combination thereof, processor 1020 may comprise an entity capable of performing operations according to embodiments of the present invention while configured accordingly. Thus, for example, when processor 1020 is embodied as an ASIC, FPGA or the like, processor 1020 may comprise specifically configured hardware for conducting one or more operations described herein. Alternatively, as another example, when processor 1020 is embodied as an executor of instructions, such as may be stored in memory 1024, the instructions may specifically configure processor 1020 to perform one or more algorithms and operations described herein.

Memory 1024 may comprise, for example, volatile storage, non-volatile storage, or some combination thereof Although shown in FIG. 8 as a single memory component, memory 1024 may comprise a plurality of memory components. The plurality of memory components may be embodied on a single computing device or distributed across a plurality of computing devices. In various embodiments, memory 1024 may comprise, for example, a hard disk, random access memory, cache memory, flash memory, a compact disc read only memory (CD-ROM), digital versatile disc read only memory (DVD-ROM), circuitry configured to store information, any other type of memory, or some combination thereof. Memory 1024 may be configured to store information, data, applications and instructions, among other things, for enabling circuitry 1000 to provide various functionality in accordance with some example embodiments of the present invention. For example, memory 1024 is configured to buffer input data for processing by processor 1020. Additionally or alternatively, in at least some embodiments, memory 1024 can be configured to store program instructions for execution by processor 1020. Memory 1024 may store information in the form of static and/or dynamic information. This information may be stored and/or used by circuitry 1000 during the course of performing its functions.

Communication interface 1022 may be embodied as any device or means embodied in circuitry, hardware, a computer program product comprising computer readable program instructions stored on a computer readable medium (e.g., memory 1024) and executed by a processing device (e.g., processor 1020), or a combination thereof that is configured to receive and/or transmit data from/to another device, such as, for example, a second circuitry 1000 and/or the like. In some embodiments, communications interface 1022 can be a component of a common accessories interface, which may also include a mechanical interface. Examples of devices using and aspects of a common accessory interface are provided in commonly-assigned U.S. patent application Ser. No. 13/085,431, titled "MOBILE PRINTER NETWORKING AND INTERFACING," which was incorporated herein by reference in its entirety.

In some embodiments, communication interface 1022 is at least partially embodied as or otherwise controlled by processor 1020. As referred to herein, being "controlled" by processor 1020 includes processor 1020 providing commands and other types of instructions as well as receiving and responding to data received by the components being instructed, among other things. In this regard, communication interface 1022 may be in communication with processor 1020, such as via a bus (not shown). Communication interface 1022 may include, for example, an antenna, a transmitter, a receiver, a transceiver, network interface card and/or supporting hardware and/or firmware/software for enabling communications with another computing device. Communications interface 1022 may also include one or more sensors, such as sensor 802, which can be configured to detect various environmental and/or other conditions (e.g., ambient light, acceleration, component position, etc.). Communication interface 1022 may also be configured to receive and/or transmit data using any protocol suitable for facilitating communications between computing and/or other types of devices. Examples of docking stations are provided in commonly-assigned U.S. patent application Ser. No. 13/085,431, titled "MOBILE PRINTER NETWORKING AND INTERFACING," which was incorporated herein by reference in its entirety. Communication interface 1022 may additionally be in communication with the memory 1024, user interface 1026 and/or any other component of circuitry 1000, such as via a bus (not shown).

User interface 1026 may be in communication with processor 1020 to receive an indication of a user input and/or to provide an audible, visual, mechanical, or other output to a user. As such, user interface 1026 may include, for example, display 108, left button 110, right button 112, menu button 114, back button 116, navigation buttons 118, feed button 120, power button 122, an audio transducer, and/or other input/output mechanisms. User interface 1026 may also be configured to facilitate the presentation of unsolicited event notifications based on instructions and/or other signals received from, e.g., processor 1020 and/or any other component included in the printer. For example, unsolicited ZPL alerts may be set using Set Get Do (SGD) commands. Some examples of ZPL alerts are included in the Zebra Programming Language's *ZPL II the Programming Guide, Volume One*, 2005, which is a registered copyrighted work owned by the assignee of this application and is hereby incorporated by reference in its entirety Circuitry 1000 may also include one or more drive motors 1028, which may be configured to move one or more media units when printing, among other things. Drive motors 1028 can be controlled by, e.g., processor 1020. For example, processor 1020 can be configured to cause electric drive motors 1028 to move one or more media units past a printhead at a first speed. In some embodiments, processor 1020 and drive motors 1028 can be configured to move various media units at various speeds. Additional examples of controlling print speed are provided in commonly-assigned U.S. patent application Ser. No. 13/085,422, titled "LABEL PEELING, UNIVERSAL PRINTHEADS AND RELATED METHODS," which has been incorporated herein by reference in its entirety.

Electrical Interface and Circuit Board Layout

Circuitry 1000 can be disposed on one or more circuit boards, which can be linked together using a three dimensional ("3D") approach. For example, multiple boards and components thereon can be collectively laid out and designed such that they fit together like a 3D puzzle inside a printer and/or other device. As such, printer's circuitry can have a relatively low vertical profile despite being stacked. For example, gaps left by components disposed on one circuit board can be at least partially filled by components disposed on a second circuit board. Such an approach, depending on how the components on each circuit board are layered together, can reduce emissions, such as wireless emissions and/or other noise, between the boards.

Board 1002, for example, can be the main board that has the processor (and other processing circuitry, such as processor 1020) and/or memory (e.g., memory 1024) disposed thereon. Board 1004 can be configured to be the personality board that has the various input and output interfaces mounted therein. The input/output interfaces can, for example, be coupled to components such as display 108, left button 110, right button 112, and navigation buttons 118. Board 1006 can be configured to be a capsulated power interface board, networking board and/or dock board that can be coupled to electrical contacts 904 (discussed above) and/or battery pack container 1008. Board 1006 can be used in a printer to provide a flexible power interface and/or wired communications interface that is configured to mate with various accessories and other devices, some examples of which are provided in commonly-assigned U.S. patent application Ser. No. 13/085,431, titled "MOBILE PRINTER NETWORKING AND INTERFACING," which was incorporated herein by reference in its entirety. In some embodiments, an additional board can include power interface circuitry (e.g., circuitry 1018) that is configured to provide a flexible battery interface (e.g., identify the type of battery, access memory to determine how to facilitate the flow of power to/from that type of battery, and operate according to the instructions stored in memory).

Ribbon connectors, such as connector 1012, can be used to electrically couple boards together. Board 1010 can also be included as a remote wireless board. Board 1010 can include, for example, BLUETOOTH component 1016 on one side and WI-FI component 1016 on the other side, as shown in the circuitry exploded view of FIG. 10F. In some embodiments, board 1010 can be omitted and the wireless communications component can be included on one or more of the other boards. Similarly, other boards discussed herein can be omitted and/or divided, such that the components discussed herein can be disposed on any of the boards discussed herein.

Board 1002 and, for example, board 1004, when mounted in the printer, can have the faces on which at least some components are mounted directed towards each other. For example, processor 1020 can be disposed on a first side of board 1002, the first side facing board 1004; and at least some of the input/output circuitry disposed on a second side of board 1004, wherein the second side faces board 1002. Processor 1020 and the input/output circuitry can be further positioned on their respective boards such that the input output circuitry is positioned in a first space unoccupied by processor 1020 (and any other the circuitry on the first circuit board), and processor 1020 is positioned in a second space between the boards that is unoccupied by the circuitry on the third circuit board.

Electrical contacts 904, shown in FIG. 10E, can be used when coupling printer 400 to a peripheral device, docking station or other type of apparatus. For example and as discussed above, electrical contacts 904 can facilitate the transfer of power to and/or from printer 400. When used as a power port, one or more of electrical contacts 904 can be used to charge the batteries of printer 400. As another example, electrical contacts 904 can function as an input port, output port, or combined input/output port that facilitates the transfer of data to and/or from printer 400 and/or a smart battery pack. When used as a data port, electrical contacts 904 can engage with, for example, a docking station and allow printer 400 and smart batteries therein to have Ethernet and/or other type(s) of network connectivity as discussed above. Smart docking may also be implemented, thereby enabling printer 400 and/or smart batteries to establish an Ethernet connection when power is provided (via, e.g., electrical contacts 904 or any other power port of printer 400). Smart docking may help increase the battery life of printer 400 by only implementing power consuming data communications while connected to an external power source. In some embodiments, power may be drawn over the Ethernet connection to charge one or more batteries of printer 400 or enable printer 400 to run without depleting its battery power.

In some embodiments, examples of which are discussed below, battery pack container 1008 can include and/or be coupled to circuitry 1018. The electrical contacts of circuitry 1018, which are configured to facilitate the transfer of power from a battery pack inside battery pack container 1008, can be elongated as shown in FIG. 10F. The elongated contacts can allow the same design/type of battery pack container 1008 to be used in printers having various sizes. For example, in a relatively small printer housing (such as a printer adapted to accommodate a two inch media roll), board 1002 may be mounted in the center of the printer's housing and make contact with the right-side portion of the contacts included in circuitry 1018. However, in a larger printer's housing (such as a printer adapted to accommodate a four inch media roll, while retaining the whistle shape shown in some of the drawings), board 1002 may be mounted towards the right of the printer's housing and make contact with the left-side portion of the contacts included in circuitry 1018 (if the battery pack is located in the center of the printer). As referred to herein, the "whistle" shape refers a back portion that is larger and more rounded, which is configured to receive a media, that tapers to a front portion that is more straight and includes a user interface on a relatively flat surface.

FIG. 11A shows an exploded view of the circuitry and other internal components that may be included in a printer, such as printers 100 and 200 discussed above. In some embodiments, one or more of the components shown in FIG. 11A can be mounted or otherwise installed on base portion 606 before defining portion 604 of the housing is coupled thereto. For example, all the components shown in FIGS. 11A (and/or FIG. 11B), except display 108 and/or other aspects of the user interface, can be mounted to base portion 606 before base 606 is slid into defining portion 604 as discussed in connection with FIGS. 13C-13F.

In some embodiments, boards 1002, 1004, 1006 and/or 1010 may be mounted to a frame (such as, e.g., frame 1102 of FIG. 11A) without using screws or other types of fasteners. Instead of or in addition to fasteners, boards 1002, 1004, and/or 1006 can slide into slots created by protrusions 1104 included in frame 1102. Protrusions 1104 may hold boards 1002, 1004, and/or 1006 in place (relative to frame 1102) as shown in FIG. 11B. In some embodiments, frame 1010 may be mounted to frame 1102 in a similar manner (despite slots and/or fasteners for board 1010 not being shown in FIGS. 11A and 11B). The printer may realize additional strength and durability as a result of the boards being mounted to frame 1102 using slots created by protrusions 1104 and/or other board receptacles that may be incorporated in frame 1102. In some embodiments, frame 1102 can be omitted and/or used in combination with a housing that includes slots and/or other mechanisms for receiving one or more circuit boards (such as those discussed in connection with FIGS. 12A-12C).

FIG. 11A also shows media roll holder 1114, which may be configured to hold a media roll, and printhead assembly 1106 (which may include a universal printhead, some examples of which are provided in commonly-assigned U.S. patent application Ser. No. 13/085,422, titled "LABEL PEELING, UNIVERSAL PRINTHEADS AND RELATED METHODS," which has been incorporated herein by reference in its entirety), locking strain relief component 1108, printer components 1110 (including the platen roller with paper sensor and cover latch, among other components), and motor 1112 (which may be included in, e.g., drive motors 1028).

FIGS. 12A-12C provide three different examples of how circuitry (such as circuitry 800) can be divided among boards 1002, 1004 and 1006. In some embodiments, board 1002 may include components generic to all printers, board 1004 may include components specific to a particular type of printer, and board 1006 can include components that allow the printer to dock with and/or otherwise couple with one or more types of accessory devices. In this regard, manufacturing costs may be reduced by mixing and matching and/or using the same or similar boards, having the same or similar components, for various printers and other devices.

For example, FIG. 12A shows circuitry arrangement 1202. In circuitry arrangement 1202, board 1002 can be configured to function as the main circuit board. For example, board 1002 can be a printed circuit board having a processor 1020 (which may include memory and/or a field programmable gate array). Communications interface circuitry, such as USB circuitry 1204 and/or wireless interface 1206 (which may be, for example, a dual radio interface configured to facilitate communications with the components on board 1010), may also be disposed on board 1002. Like any component discussed herein USB circuitry 1204 may be optionally disposed on board 1002. For example, USB circuitry 1204 may enable the printer to function as a USB host device (as opposed or in addition to as a USB slave device).

Printhead interface 1208 can also be included on board 1002 and be configured to send commands and/or otherwise cause indicia to be printed onto media. Board 1002 may also include bar/paper sensor 1210 which may be configured to determine the position of a peel bar and/or print media (e.g., paper, labels, etc.). Keypad interface 1212 can be disposed on board 1002 as a type of user interface 1026 (discussed above), which is configured to enable the use of one or more user input components (such as those discussed in connection with FIGS. 1-3N). In some embodiments, a back-up battery, such as coin cell battery 1214, can be included in board 1002. Coin cell battery 1214 may be used to, e.g., power the real time clock, among other things. Additionally or alternatively, power supplies and control circuitry 1216, which can be configured to facilitate the supply of power to the circuitry. One or more battery contacts 1218, which are configured to make electrical contact and facilitate the flow of electricity with one or more batteries, can be included on board 1002. Charging circuitry 1220 can also be disposed on board 1002 and be configured to facilitate the charging of a battery by controlling the flow of energy from a source of power (such as an AC/DC converter that is not shown) to battery contacts 1218.

Board 1002 can be electrically coupled to board 1004 via bus 1222. Bus 1222 may be, for example, a ribbon cable and/or any other connector component(s) that is configured to facilitate the transmission of instructions, commands and/or other types of electrical signals that support, for example, color thin film transistor ("TFT") liquid crystal display ("LCD"), touch sensitive functionality and/or Inter-Integrated Circuit ("I²C") interface (e.g., board 1004's identifying data, etc.), among other things. Board 1004 may include one more components specific to a particular type, model, and/or other configuration. As such, board 1004 may be considered a personality board that can be configured to include standard and/or customer-selected upgradeable features (e.g., upgraded display screen, sensors, audio speakers, etc.), other user-customizable differences and/or any other type of difference. For example, user display circuitry, such as LCD interface 1224, can be disposed on board 1004. LCD interface 1224 can be a type of user interface 1026 that is specific to a particular display screen. For example, in embodiments that use a light emitting diode ("LED") display component, LCD interface 1224 may be replaced with a LED interface. Additionally or alternatively, gap emitter 1226, peeler sensor circuitry 1228, peeler engaged detection component 1230, printhead-open detection circuit 1232, media-width sensing component 1234, motor drive and booster circuitry 1236, USB host circuitry 1238, RS232 serial interface 1240 and/or audio component 1242, among other things, can be disposed on board 1004 in some embodiments. Like any other component discussed herein, any of the components shown as being disposed on board 1004 may be upgraded, downgraded, removed, combined or replaced with one or more other components.

Board 1002 can be electrically coupled to board 1006 via connector 1012. Connector 1012 may be, for example, a ribbon cable and/or any other connector component(s) that is configured to facilitate the transmission of instructions, commands and/or other types of electrical signals that support, for example, charger input power, Ethernet data communications, and/or I²C dock/battery communications, among other things. Board 1006 may include one more components specific to the networking and/or accessory devices that the printer can be configured to utilize. For example, Ethernet interface 1246, I²C interface 1248, charger port 1250 and dock interface 1252 can be disposed on board 1006. As such, board 1006 can be configured to provide docking functionality. In some embodiments, different components can be included on board 1006 to enable a printer and/or other devices to be configured to couple with other types of docks.

FIG. 12B shows circuitry arrangement 1254 as a second example of how circuitry (such as circuitry 800) can be divided among boards 1002, 1004 and 1006. In circuitry arrangement 1254, board 1002 can be configured to function as the main circuit board similar to circuitry arrangement 1202 of FIG. 12A. For example, board 1002 can be a printed circuit board having a processor 1020 (which may include memory and/or a field programmable gate array). Communications interface circuitry, such as wireless interface 1206 (which may be configured to facilitate communications with the components on board 1010), may also be disposed on board 1002 in circuitry arrangement 1254. Printhead interface 1208 can also be included on board 1002 in circuitry arrangement 1254 and be configured to facilitate the sending of commands and/or otherwise cause indicia to be printed onto media. In some embodiments, processor 1020 may be configured to generate the commands which cause, for example, printhead interface 1208 and/or any other component discussed herein to send its respective commands.

Board 1002 may also include bar/paper sensor 1210 which may be configured to determine the position of print media (e.g., paper, labels, etc.) based on, e.g., a black line or "bar" that is preprinted on one or more print media units of the media roll for identifying where labels, perforated tags and/or any other type of print media start and end. The same sensor is used to identify if print media of any type has been installed in the printer. However, bar/paper sensor 1210 can be positioned in a different place relative to the other components on board 1002 in circuitry arrangement 1254 (as compared to, e.g., the position of bar/paper sensor 1210 of circuitry arrangement 1202). The placement of bar/paper sensor 1210 on board 1002 in circuitry arrangement 1254 can provide one or more benefits, such as aid in noise reduction and/or allow circuit board 1002 to fit together with the other boards of circuitry arrangement 1254, among other things.

Keypad interface 1212 can be disposed on board 1002 as a type of user interface 1026 (discussed above), which is configured to enable the use of one or more user input components (such as those discussed in connection with FIGS. 1-3N). In some embodiments, a back-up battery, such as coin cell battery 1214, can be included in board 1002. Additionally or alternatively, power supplies and control circuitry 1216, which can be configured to facility the supply of power to the circuitry. One or more battery contacts 1218, which are configured to make electrical contact and facilitate the flow of electricity with one or more batteries, can be included on board 1002. Charging circuitry 1220 can also be disposed on board 1002 and be configured to facilitate the charging of a battery from a power source to battery contacts 1218.

One or more components disposed on board 1002 in circuitry arrangement 1202 may be omitted from board 1002 (and/or any other board) in circuitry arrangement 1254. For example, USB circuitry 1204 is omitted from board 1002 in circuitry arrangement 1254.

Board 1002 can be electrically coupled to board 1004 via bus 1222. Bus 1222 may facilitate instructions, commands and/or other types of electrical signals that support, for example, color TFT LCD functionality, touch sensitive functionality and/or I²C I/F communications (e.g., transmission of data signals that identify board 1004 to board 1002, etc.), among other things. Board 1004 may include one more components specific to a particular type, model, and/or other configuration, which may be different than that shown in FIG. 12A. As such, a similar or same main printed circuit board, e.g., board 1002, may be included in printers that have different personality boards, e.g., board 1004, and/or docking boards, e.g., board 1008.

For example, rather than include LCD interface 1224, board 1004 in circuit arrangement 1254 may include monochrome/TFT LCD interface 1256. Monochrome/TFT LCD interface 1256 can be a type of user interface 1026 that the processor can be configured to drive a mono./TFT LCD display screen, which may be an example upgrade from a traditional LCD screen that the customer may choose to have.

Additionally or alternatively, GAP emitter 1226, peeler sensor circuitry 1228, peeler engaged switch 1230, printhead-open detection circuit 1232, media-width sensing component 1234, motor drive and booster circuitry 1236, USB host circuitry 1238, and/or serial input/output interface and transceiver 1258, among other things, can be disposed on board 1004 in some embodiments. Serial input/output interface and transceiver 1258, for example, can include acircuit and connector that an external device, like a computer, can use to communicate through the printer to another device, such as another printer.

Board 1002 can be electrically coupled to board 1006 via connector 1012. Connector 1012 may facilitate instructions, commands and/or the transfer of other types of electrical signals that support, for example, charger input power, Ethernet data communications, and/or I²C dock/battery communications, among other things. Board 1006 may include one more components specific to the networking and/or accessory devices that the printer can be configured to utilize. For example, while Ethernet interface 1246 can be omitted from board 1012 of circuitry arrangement 1254, I²C interface 1248, charger port 1250 and dock interface 1252 can be disposed on board 1006 in both circuitry arrangement 1254 and circuitry arrangement 1202. As such, board 1006 can be configured to provide docking and charging functionality.

In some embodiments, different components can be additionally or alternatively included on board 1006 to enable a printer and/or other devices to be configured to facilitate various communication protocols. For example, Ethernet physical layer circuitry 1260 and Ethernet clock 1262 can be separate components disposed on board 1006 (as opposed to the combined component shown in FIG. 12A). As another example, electromagnetic interference/electrostatic discharge ("EMI/ESD") suppression component 1264 may also be included on board 1006.

FIG. 12C shows circuitry arrangement 1266 as a third example of how circuitry (such as circuitry 800) can be divided among boards 1002, 1004 and 1006. In circuitry arrangement 1266, board 1002 can be configured to function as the main circuit board similar to circuitry arrangement 1202 of FIG. 12A. For example, board 1002 of circuitry arrangement 1266 can be a printed circuit board having a processor 1020 (which may include memory and/or a field programmable gate array). Communications interface circuitry, such as wireless interface 1206 (which may be configured to facilitate communications with the components on board 1010), may also be disposed on board 1002 in circuitry arrangement 1266. Printhead interface 1208 can also be included on board 1002 in circuitry arrangement 1266 and be configured to facilitate the sending of commands and/or otherwise cause indicia to be printed onto media. In some embodiments, processor 1020 may be configured to generate the commands which cause, for example, printhead interface 1208 and/or any other component discussed herein to send its respective commands.

In circuitry arrangement 1266, board 1002 may also include bar/paper sensor 1210 which may be configured to determine the position of a peel bar and/or print media (e.g., paper, labels, etc.). However, bar/paper sensor 1210 can be positioned in a different place relative to the other components of circuitry arrangement 1266 (as compared to, e.g., the position of bar/paper sensor 1210 in circuitry arrangement 1202 or circuitry arrangement 1254). The placement of bar/paper sensor 1210 on board 1002 can provide one or more benefits, some of which are discussed above.

Keypad interface 1212 can be disposed on board 1002 as a type of user interface 1026 (discussed above), which is configured to enable the use of one or more user input components (such as those discussed in connection with FIGS. 1-3N). In some embodiments, a back-up battery, such as coin cell battery 1214, can be included in board 1002. Additionally or alternatively, power supplies and control circuitry 1216, which can be configured to facility the supply of power to the circuitry. One or more battery contacts 1218, which are configured to make electrical contact and facilitate the flow of electricity with one or more batteries, can be included on board 1002. Charging circuitry 1220 can also be disposed on board 1002 and be configured to facilitate the charging of a battery from a source of power to battery contacts 1218.

One or more components disposed on board 1002 in circuitry arrangement 1202 and/or circuitry arrangement 1254 may be omitted from board 1002 (and/or any other board) of circuitry arrangement 1266. For example, USB circuitry 1204 is omitted from board 1002 in circuitry arrangement 1266.

Board 1002 can be electrically coupled to board 1004 via bus 1222. Bus 1222 may facilitate instructions, commands and/or other types of electrical signals that support, for example, color TFT display functionality, touch sensitive functionality and/or I²C I/F communications (e.g., transmission of data signals that identify board 1004 and/or the components disposed thereon to board 1002 and/or the components disposed thereon, etc.), among other things. Board 1004 may include one more components specific to a particular type, model, and/or other configuration, which may be different than that shown in FIGS. 12A and/or 12B. As such, a similar or same main printed circuit board, e.g., board 1002, may be included in printers that have different personality boards, e.g., board 1004, and/or docking boards, e.g., board 1008.

For example, rather than include LCD interface 1224, board 1004 in circuit arrangement 1254 may include monochrome display interface 1268. Mono./TFT LCD interface 1256 can be a type of user interface 1026 that the processor can be configured to drive a color TFT display touch-sensitive screen, which may be an example upgrade from a traditional LCD screen that the customer may choose to have.

Additionally or alternatively, GAP emitter 1226, peeler sensor circuitry 1228, peeler engaged switch 1230, printhead-open detection circuit 1232, media-width sensing component 1234, motor drive and booster circuitry 1236, USB host circuitry 1238, audio output 1244, and/or serial input/output interface and transceiver 1258, among other things, can be disposed on board 1004 in some embodiments.

Board 1002 can be electrically coupled to board 1006 via connector 1012. Connector 1012 may facilitate instructions, commands and/or the transfer of other types of electrical signals that support, for example, charger input power from a docking station, Ethernet data communications from/for the docking station, and/or I²C I/F communications for the docking station, peripherals and smart battery, among other things. Board 1006 may include one more components specific to the networking and/or accessory devices that the printer can be configured to utilize. For example, Ethernet interface 1246 can be included on board 1012 of circuitry arrangement 1266 as well as I²C interface 1248, docking interface 1252, and EMI/ESD suppression component 1264.

Scalable Printer Housing

As noted above, the "whistle" shape of printer 400 and/or the overall size of the printer can be scalable and/or change for different printers. For example, a printer that is configured to accommodate a 4 inch media roll may be larger than a printer that is configured to accommodate a media roll up to (and including) 2 inches. As another example, a larger display screen may be included as an upgrade to the standard sized display screen, requiring more space on defining portion 604 of the printer's housing.

While different printers may have different sized and shaped defining portions 604 shown in FIGS. 13A and 13C-13F, the different printers can each include the same bottom housing portion, such as base portion 606 shown in FIG. 13B-13F, that is at least substantially the same shape and size. The common bottom or "base" housing portion can also include, for example, a coupling area that includes a common communications interface, such as electrical contacts 904, detents 704 and 802, and/or notches 1308, among other things, which can be spaced apart and shaped consistently across printers and/or other devices. In some embodiments, the coupling area can be defined by the size and shape of at least the portion of base portion 606 that includes these features. For example, all base portions and/or coupling areas may be defined by the same width, "w", of the portion of base portion 606 that includes battery receptacle 1316. Even embodiments that do not include a battery receptacle or a smaller battery receptacle than what is shown in FIG. 13B, may include one or more pieces of housing that separates detent 802 from detent 704 (not shown in FIG. 13B, but discussed above in connection with FIG. 7) and/or separates notches 1308 at the width "w". In other words, the coupling area can be defined by the relative positioning of notches 1308, electrical contacts 1104 (e.g., flanking the distal ends of electrical contacts 1104) and/or detents 704, 802 in three dimensional space. An accessory device and/or any other type of device may include a reciprocal coupling area that is configured to receive, engage and/or otherwise couple with one or more of notches 1308, electrical contacts 1104 and/or detents 704, 802. Some examples of accessory devices are discussed in connection with commonly assigned U.S. Pat. No. 13/085,431, titled "MOBILE PRINTER NETWORKING AND INTERFACING," which was incorporated herein by reference in its entirety).

Incorporating such homogenous base portions and/or at least common coupling areas with different printer housing defining portions and/or types of devices (having, e.g., different sizes, features, materials and functionality, among other things) can enable a wide variety of printers and/or other devices to be configured to interface with common accessories and peripheral devices, among other things, that include a reciprocal coupling area configured to mate with the features included in the coupling area shown FIG. 13B. For example, wider mobile printers (such as that shown in FIGS. 13D and 13F) may be configured to accommodate wider rolls of media by having a wider defining portion 404, but have the same or similar sized and shaped base portion 606 (or at least same or similar sized and shaped coupling area) as a smaller printer (such as that shown in FIGS. 13C and 13E) that is configured to accommodate narrower rolls of media. As another example, longer mobile printers may be configured to accommodate larger display screens and/or more buttons by having a longer defining portion 604, but have the same or similar sized and shaped base portion 606 (or at least same or similar sized and shaped coupling area) as a shorter printer that is configured to accommodate smaller display screens. Despite the relatively larger width and/or length, some embodiments of wider, longer mobile printers may still conform to the whistle shape shown in FIGS. 1 and 4-8B. Similarly, other printers (such as that shown in FIG. 3N) that do not conform to the whistle shape may still have the common coupling area and/or base portion 606.

Further to the discussion above, the seam line between defining portion 604 and base portion 606 does not run around the lateral sides of printer 400, but instead runs off center along the bottom edge of the printer's housing. While some embodiments of mobile printers may utilized a split "upper/lower" housing approach (such as that shown in FIG. 1), other embodiments may use more of an "defining/base" housing body design (such as that shown in FIGS. 4-8B, for example). The defining/base split can create a more continuous uni-body structure that may fare much better in durability testing. The complexity of overmolds sometimes applied to printer housings can also been reduced with the defining/base split discussed herein. For example, rather than apply an overmold to both the upper and lower housing portions, the overmold may instead be applied to only the defining portion of the housing and/or otherwise located in a location remote from the seam between the base and defining portions of the housing.

For example, some embodiments may include a printer, comprising circuitry (such as that discussed above) and a housing, such as that shown in FIGS. 13A and 13B, that at least substantially defines a shape of the printer's six sides. In addition to defining portion 604 and base portion 606, the housing can include an overmold (not shown). Defining portion 606 can at least substantially define five of the printer's six sides (e.g., top, right, left, front and back sides) as shown in FIGS. 4-8B. Base portion 606 can at least substantially define the printer's sixth side (e.g., the bottom side) as shown in FIGS. 9 and 13B. The overmold can then at least partially cover the defining portion 606 and, in some embodiments, fail to cover the base portion 604. In some embodiments, the printer can further comprise a second overmold (not shown) that at least partially covers the base portion 604.

Additionally, printer housings that utilize the defining/base body design may realize improved durability as a result of eliminating the seam line on the portion of the external, defining plastic printer housings that is most likely to contact the ground when dropped on the printer's side wall 1302, front wall 1304, and curved back wall 1306, which are shown in FIG. 13A. Because base portion 606 is within and at least largely surrounded by defining portion 604 on all four sides as well as its top portion, base portion 606 is largely protected by defining portion 604 and its protective features (such as an overmold). In this regard, the shape and the size of the printer can be defined almost entirely by defining portion 604, while the networking interface(s), accessory interface(s), chassis, circuitry and/or other common printer components can be mounted or otherwise protected by base portion 606 that can be substantially similar or the same for printers that otherwise look completely different (e.g., have completely different defining portions).

In other embodiments, the seam line between the base portion and defining portion may run along a top edge of the bottom portion (as opposed to the bottom edge of an upper portion as shown in FIGS. 13A and 13B), and the bottom portion may be considered the "defining" portion of the printer's housing (not shown) that is configured to at least largely surround all four sides and the bottom of a top portion. Similarly, one skilled in the art may realize from the discussion herein that the seam line may run along a back edge, front edge, right side edge, or any other edge (none which are shown herein), such that the defining portion is neither the "top" nor the "bottom" of the printer's housing without departing from the spirit of the embodiments discussed herein. In these alternative embodiments, like those shown in FIGS. 13A and 13B, one piece of the printer's housing, referred to herein as the defining portion, substantially surrounds most of the printer (e.g., at least five of the six sides) and largely defines the printer's shape and external features.

Base portion 606, as shown in FIG. 13B, can also be used as part of a common accessories interface that can mechanically and/or electrically couple with a variety of different printers, thereby reducing the number of printer accessories needed to support one or more product lines. For example, the defining/base housing design and the features incorporated in the base portion can allow for a single accessories interface across printer family sizes. Printers having a whistle shape (such as those shown in FIGS. 4-8B), for example, can have a common base area, shape and coupling components regardless of the printer's overall width (as determined by defining portion 604 of the printer's housing in the example shown in FIGS. 13A and 13B). For example, in addition to the coupling components discussed above (e.g., cavity 704 and cavity 802 adapted to receive a spring loaded or other type of mechanical coupling device and electrical contacts 904), base portion 606 can also include notches 1308 adapted to receive and lock onto male connecting components of a docking, peripheral, and/or other accessory device, among other things.

Figures 13C, 13D:
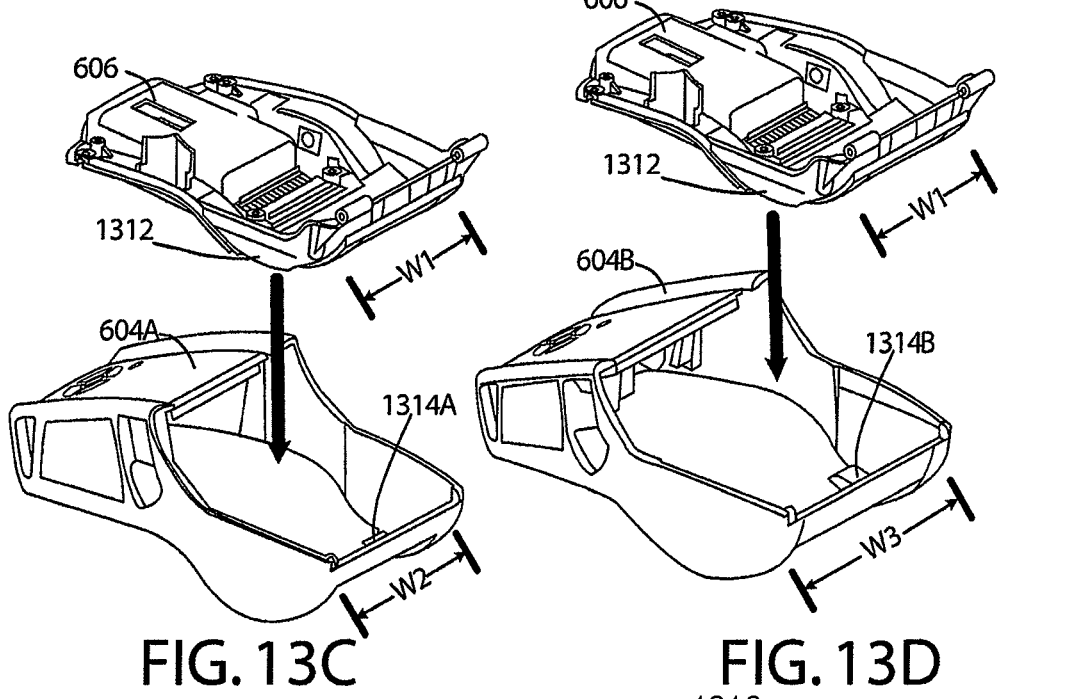

FIG. 13C and 13D show base portions 606 having a width "W1" being installed into two different defining portions 604A and 604B. Defining portion 604A has width W2, which may be larger than W1, but smaller than W3 of defining portion 604B. In this regard, base portions 606 dictate the minimum size or footprint of a printer, while the defining portion 604A,604B dictates the general shape, size (e.g., overall height, width, length), features, and aesthetics, among other things, of the printer. For example, because of its larger size, defining portion 604B may be configured to receive a larger media roll and/or display screen than defining portion 604A, even though both defining portions 604A, 604B may utilize the same base portion 606 and the same or similar circuitry.

In some embodiments, base portions 606 can be installed into defining portions 604A,604B through an opening that will eventually be covered by, e.g., a media cover, which may be coupled to base portion 606. Upon sliding in and/or otherwise being inserted into defining portions 604A,604B, one or more flanges 1312 and/or other components of base portions 606 can be aligned with one or more components of defining portions 604A,604B. For example, fastener holes included in each piece may be aligned. As another example, mounting ridges 1314A of defining portion 604A and 1314B of defining portion 604B may be aligned with flanges 1312 of the respective base portion 606.

Figures 13E, 13F:
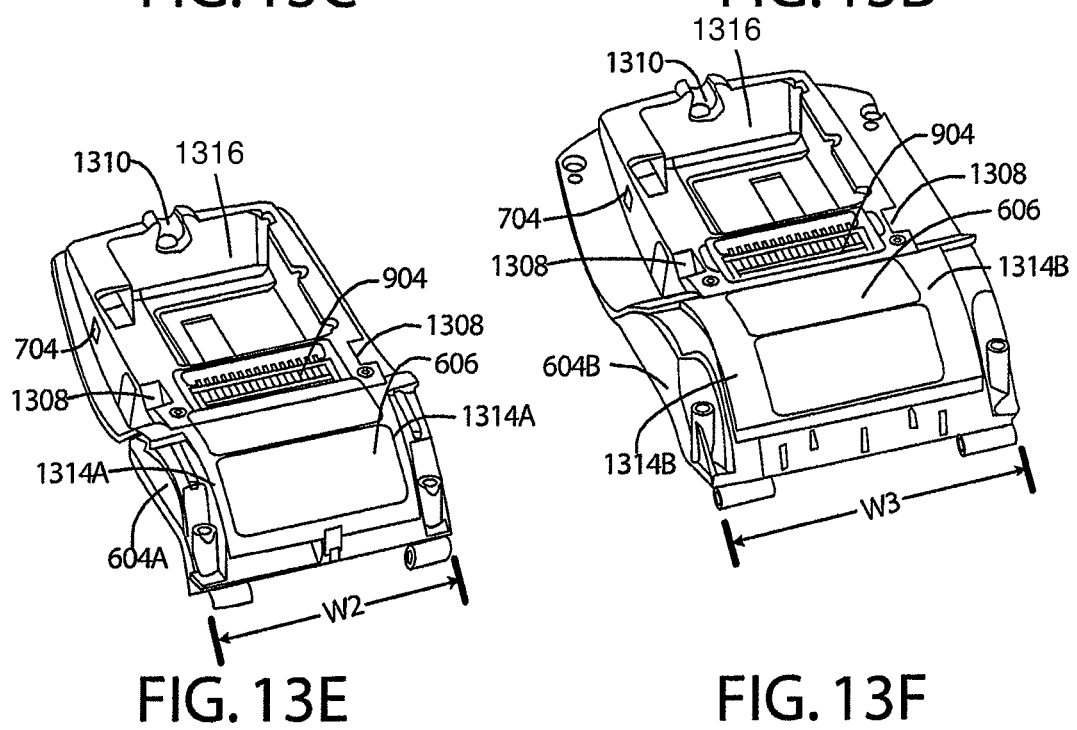

FIGS. 13E and 13F show a bottom view of defining portion 604A and defining portion 604B mated with a respective base portion 606. Also shown is how flanges 1314B may be larger than flanges 1314A as a result of defining portion 604B being wider than defining portion 604A. In some embodiments, defining portion 604B may instead or additionally be longer and/or higher than defining portion 604A.

Defining portion 604 and/or base portion 606 can also include and or be adapted to integrate with one or more strain relief components, such as locking strain relief component 1108 discussed above. For example, the custom designed overmold can enable USB and/or other type(s) of cables to be mounted with a custom molded (e.g., plastic) strain relief component (which may be part of the cable assembly) that is configured to lock the cable into place when engaged with the printer. The strain relief component can be configured to transfer at least most (if not all) external stress applied to the cable(s) into the housing to relieve stress from, e.g., the USB connector mounted on, e.g., the device's printed circuit board. Additional examples of the strain relief component are discussed above.

Belt Clip

Some embodiments discussed herein may also include a removable belt clip that snaps or is otherwise secured by, e.g., battery cover 902 of a printer and/or other device. For example, FIG. 13B shows battery cover 902 removed from base portion 606 with battery receptacle 1316 exposed. A belt clip, such as belt clip 402 shown in FIG. 14A, may included clip component 1402 that is configured to couple with a belt and/or other apparatus and mounting component 1404 that is configured to mate with belt clip receptacle 1310 as shown in FIG. 14B. Belt clip receptacle 1310 can include a rounded cavity as shown in FIG. 13B and mounting component 1404 can include a spherical shape that causes it to swivel and otherwise move within belt clip receptacle 1310. In some embodiments, the battery cover 902 can be mated with the battery receptacle (as shown in FIG. 9), and be configured to aid in preventing batteries from falling out of the battery receptacle as well as aid in preventing belt clip 402 from falling out of belt clip receptacle 1310.

In some embodiments, battery cover 902 (or a different battery cover that is not shown) can be configured to substantially fill belt clip receptacle 1310 when a belt clip is not filling belt clip receptacle 1310. This may help prevent dirt and other material from getting into the battery receptacle when a belt clip is not inserted into belt clip receptacle 1310.

CONCLUSION

Various other features for, modifications to and other embodiments of the inventions set forth herein will come to mind to one skilled in the art to which these inventions pertain having the benefit of the teachings presented in the foregoing descriptions and the associated drawings. For example, while examples discussed herein are often related to mobile printers, one skilled in the art would appreciate that other types of printers, such as desktop or less mobile printers, as well as other types of devices may benefit from embodiments discussed herein. Therefore, it is to be understood that the inventions are not to be limited to the specific embodiments disclosed and that modifications and other embodiments are intended to be included herein. Although specific terms are employed herein, they are used in a generic and descriptive sense only and not for purposes of limitation.

That which is claimed is:
1. A printer, comprising:
circuitry that includes:
    a processor;
    connector circuitry; and
    input/output circuitry;
a first circuit board onto which the processor is disposed;
a second circuit board onto which the connector circuitry is disposed; and
a third circuit board onto which the input/output circuitry is disposed, wherein:
    the circuitry is disposed on the first circuit board and the third circuit board such that, when mounted in the printer the processor is disposed on a first side of the first circuit board, the first side facing the third circuit board; and
    the input/output circuitry is disposed on a second side of the third circuit board, the second side facing the first circuit board.
2. The printer of claim 1, wherein:
the processor and the input/output circuitry are positioned such that the input output circuitry is positioned in a first space unoccupied by the circuitry on the first circuit board; and the processor is positioned in a second space unoccupied by the circuitry on the third circuit board.

3. The printer of claim 1 further comprising an internal frame having slots configured to receive the first circuit board and the third circuit board.

4. The printer of claim 1, wherein the first circuit board and the third circuit board are configured to slide into slots included in a housing of the printer.

5. The printer of claim 1 further comprising a ribbon cable configured to couple the first circuit board with the second circuit board.

6. The printer of claim 1, wherein the first circuit board, the second circuit board and the third circuit board are positioned to reduce noise emissions among the circuitry.

7. The printer of claim 1 further comprising memory disposed on the first circuit board.

8. The printer of claim 1, wherein the connector circuitry is configured to facilitate wired communications with an external device.

9. The printer of claim 1 further comprising wireless communications circuitry disposed on a fourth circuit board.

10. The printer of claim 9, wherein:
a first communications component is disposed on a first side of the fourth circuit board and a second communications component is disposed on a second side of the fourth circuit board, the first side and the second side facing opposite directions;
the first communications component is configured according to a first wireless communications protocol; and
the second communications component is configured according to a second wireless communications protocol different than the first wireless communications protocol.

11. The printer of claim 1, wherein the connector circuitry is wireless communications circuitry.

12. The printer of claim 1 further comprising a fourth circuit board, wherein the circuitry further comprises power interface circuitry disposed on the fourth circuit board.

13. The printer of claim 12, wherein the power interface circuitry is configured to provide a flexible battery interface.

14. The printer of claim 1, wherein the input/output circuitry is configured to generate signals representing a user input from four directional buttons, a selection button and two soft buttons.

15. The printer of claim 14, wherein the input/output circuitry is further configured to generate signals that drive a display screen.

16. A printer, comprising:
circuitry that includes:
a processor;
connector circuitry; and
input/output circuitry;
a first circuit board onto which the processor is disposed;
a second circuit board onto which the connector circuitry is disposed;
a third circuit board onto which the input/output circuitry is disposed; and
wireless communications circuitry disposed on a fourth circuit board.

17. The printer of claim 16, wherein:
a first communications component is disposed on a first side of the fourth circuit board and a second communications component is disposed on a second side of the fourth circuit board, the first side and the second side facing opposite directions;
the first communications component is configured according to a first wireless communications protocol; and
the second communications component is configured according to a second wireless communications protocol different than the first wireless communications protocol.

18. A printer, comprising:
circuitry that includes:
a processor;
connector circuitry; and
input/output circuitry;
a first circuit board onto which the processor is disposed;
a second circuit board onto which the connector circuitry is disposed;
a third circuit board onto which the input/output circuitry is disposed; and
a fourth circuit board, wherein the circuitry further comprises power interface circuitry disposed on the fourth circuit board.

19. The printer of claim 18, wherein the power interface circuitry is configured to provide a flexible battery interface.

* * * * *